(12) United States Patent
Kim

(10) Patent No.: US 11,443,650 B2
(45) Date of Patent: Sep. 13, 2022

(54) METHOD AND APPARATUS FOR VR TRAINING

(71) Applicant: Kwangwoon University Industry-Academic Collaboration Foundation, Seoul (KR)

(72) Inventor: Hyun Kyung Kim, Seoul (KR)

(73) Assignee: Kwangwoon University Industry-Academic Collaboration Foundation, Seoul (KR)

(*) Notice: Subject to any disclaimer, the term of this patent is extended or adjusted under 35 U.S.C. 154(b) by 0 days.

(21) Appl. No.: 17/102,890

(22) Filed: Nov. 24, 2020

(65) Prior Publication Data

US 2021/0158715 A1    May 27, 2021

(30) Foreign Application Priority Data

Nov. 25, 2019  (KR) .................. 10-2019-0152471
Nov. 25, 2019  (KR) .................. 10-2019-0152473

(51) Int. Cl.
*G09B 9/00* (2006.01)
*G06F 17/18* (2006.01)
*G06T 19/00* (2011.01)

(52) U.S. Cl.
CPC .............. *G09B 9/00* (2013.01); *G06F 17/18* (2013.01); *G06T 19/006* (2013.01)

(58) Field of Classification Search
CPC ........ G06F 17/18; G06F 3/011; G06T 19/006; G09B 9/00
See application file for complete search history.

(56) References Cited

U.S. PATENT DOCUMENTS

| 6,416,328 B1* | 7/2002 | Callahan ................ G16H 40/20 434/322 |
| 2006/0147882 A1* | 7/2006 | Sambucetti ............ G09B 19/00 434/219 |
| 2009/0029335 A1* | 1/2009 | Gyaraki .................. G09B 7/00 434/350 |

(Continued)

FOREIGN PATENT DOCUMENTS

| KR | 101002751 B1 | 12/2010 |
| KR | 20170135537 A * | 12/2017 |

(Continued)

OTHER PUBLICATIONS

Office Action of Korean Application No. KR 10-2019-0152473 dated Mar. 3, 2021.

(Continued)

*Primary Examiner* — Robert J Utama
*Assistant Examiner* — Correll T French
(74) *Attorney, Agent, or Firm* — Paratus Law Group, PLLC

(57) ABSTRACT

According to an exemplary embodiment, a method for operating a virtual reality (VR) device includes performing a VR training operation, acquiring information about an immersion level while performing the VR training operation, comparing the information about an immersion level with a predetermined threshold value, and performing a first operation for improving an immersion level of a user when the information about an immersion level is lower than the predetermined threshold value.

14 Claims, 10 Drawing Sheets

(56) References Cited

U.S. PATENT DOCUMENTS

| | | | | |
|---|---|---|---|---|
| 2013/0302760 | A1* | 11/2013 | Welles | G09B 9/052 434/69 |
| 2015/0099252 | A1* | 4/2015 | Anderson | G06T 7/0014 434/257 |
| 2015/0262484 | A1* | 9/2015 | Victor | G09B 19/167 701/1 |
| 2016/0077547 | A1* | 3/2016 | Aimone | A61B 5/0022 345/8 |
| 2017/0162072 | A1* | 6/2017 | Horseman | G09B 7/02 |
| 2017/0364153 | A1* | 12/2017 | Kazansky | G06F 3/0304 |
| 2018/0129276 | A1* | 5/2018 | Nguyen | G09B 9/00 |
| 2018/0286070 | A1* | 10/2018 | Benedetto | G06F 3/013 |
| 2018/0290017 | A1* | 10/2018 | Fung | A63F 13/65 |
| 2019/0223746 | A1* | 7/2019 | Intrator | G06T 19/006 |

FOREIGN PATENT DOCUMENTS

| | | | |
|---|---|---|---|
| KR | 20190092141 A | * | 8/2019 |
| KR | 1020190092141 A | | 8/2019 |

OTHER PUBLICATIONS

H.K. Kim, et al., "Virtual Reality Sickness Questionnaire (VRSQ): Motion Sickness Measurement Index in a Virtual Reality Environment", Journal, Applied Ergonomics, 2018, vol. 69, pp. 66-73, Department of Industrial and Management Engineering, Pohang University of Science and Technology (POSTECH), Cheongam-ro 77, Nam-gu, Pohang, Gyeongbuk 37673, Republic of Korea, & Department of Industrial and Management Engineering, Incheon National University (INU), Academy-ro 119, Yeonsu-gu, Incheon 22012, Republic of Korea.

Katy Tcha-Tokey, et al., "Proposition and Validation of a Questionnaire to Measure the User Experience in Immersive Virtual Environments", The International Journal of Virtual Reality, 2016, vol. 16, No. 1, pp. 33-48, LAMPA, Arts et Métiers Paris Tech, France, & CRP-CPO, Université de Picardie Jules Verne, France.

Dong Zhao, et al., "Virtual Reality Simulation for Construction Safety Promotion", International Journal of Injury Control and Safety Promotion, 2015, vol. 22, No. 1, pp. 57-67, Department of Building Construction, Virginia Polytechnic Institute and State University, Blacksburg, VA 24061, & Department of Construction Science and Management, Clemson University, Clemson, SC 29634.

Quang Tuan Le, et al., "A Social Virtual Reality Based Construction Safety Education System for Experiential Learning", Journal of Intelligent and Robotic Systems, Sep. 2014, vol. 79, No. 3-4, pp. 487-506.

Rafael Sacks, et al., "Construction Safety Training Using Immersive Virtual Reality", Journal of Construction Management and Economics, Jul. 2013, vol. 31, No. 9, pp. 1005-1017, Faculty of Civil and Environmental Engineering, Technion—Israel Institute of Technology, Rabin Building, Technion Campus, Haifa 32000, Israel, & Department of Management, Bar Ilan University, Management, Ramat Gan, Israel.

Etienne Van Wyk, et al., "Virtual Reality Training Applications for the Mining Industry", Conference: Proceedings of the 6th International Conference on Computer Graphics, Virtual Reality, Visualisation and Interaction in Africa, Afrigraph 2009, Pretoria, South Africa, Feb. 6, 2009, pp. 53-63.

T.S. Mujber, et al., "Virtual Reality Applications In Manufacturing Process Simulation", Journal of Materials Processing Technology, Nov. 30, 2004, vols. 155-156, pp. 1834-1838, School of Mechanical and Manufacturing Engineering, Dublin City University, Glasnevin, Dublin 9, Ireland.

Mel Slater, "Measuring Presence: A Response to the Witmer and Singer Presence Questionnaire", Presence: Teleoperators and Virtual Environments, Oct. 1999, vol. 8, No. 5, pp. 560-565, Massachusetts Institute of Technology.

A.C. Boud, et al., "Virtual Reality and Augmented Reality as a Training Tool for Assembly Tasks", Published in: 1999 IEEE International Conference on Information Visualization (Cat. No. PR00210), Feb. 1, 1999 pp. 32-36, Conference Location: London, UK, United Kingdom.

Bob G. Witmer, et al., "Measuring Presence in Virtual Environments: A Presence Questionnaire", Presence: Virtual and Augmented Reality, Jun. 1998, vol. 7, No. 3, pp. 225-220, U.S. Army Research Institute for the Behavioral and Social Sciences, & Massachusetts Institute of Technology.

James P. Bliss, et al., "The Effectiveness of Virtual Reality for Administering Spatial Navigation Training to Firefighters", Human Factors and Ergonomics Society Annual Meeting Proceedings, Presence: Teleoperators & Virtual Environments, Feb. 1997, vol. 6, No. 1, pp. 73-86, The University of Alabama in Huntsville.

* cited by examiner

METHOD AND APPARATUS FOR VR TRAINING

CROSS-REFERENCE TO RELATED APPLICATIONS

This application is based on and claims priority from Korean Patent Applications No. 10-2019-0152473, filed on Nov. 25, 2019, and No. 10-2019-0152471, filed on Nov. 25, 2019 with the Korean Intellectual Property Office, the disclosure of which is incorporated herein in its entirety by reference.

TECHNICAL FIELD

The present disclosure relates to a method and an apparatus for performing a training simulation by utilizing a VR machine, and also relates to a method and an apparatus for providing VR training related additional information by utilizing a VR machine.

BACKGROUND

Various systems using a VR electronic device are being developed in accordance with development of wearable devices which can be worn on the body. The wearable device may be attachable to a body or clothing which can be worn on the body, such as a head-mounted device (HMD), a smart watch, and a wristband. As a plurality of wearable devices is used, a VR system in which functions of the plurality of devices are combined is also being developed.

With the development of a display technology, the spread of head mounted display (HMD) devices is increasing, and accordingly, various VR technologies using head mounted devices are being developed. The head mounted display device may provide realistic VR services using the display disposed in front of user's eyes and the motion of the user.

In accordance with the development of the VR technology, a virtual reality hardware/software technology has recently been developed and popularized in various fields. When the VR technology is used, users may safely experience situations which require actual space/products, are expensive, or are dangerous or difficult to experience in real environments. Accordingly, there is a necessity for an attempt to utilize the VR technology as tools for education or training in various fields. Further, various methods for improving a VR training efficiency are demanded.

RELATED ART DOCUMENT

Patent Document (Patent Document 1) Korean Unexamined Patent Application Publication No. 10-2018-0028033 (Mar. 15, 2018)

SUMMARY

The present disclosure has been made in an effort to provide a method and an apparatus for performing a training simulation by utilizing a VR machine.

A technical object to be achieved by an exemplary embodiment of the present disclosure is to provide a method and an apparatus for performing VR training by utilizing a VR machine.

A technical object to be achieved by an exemplary embodiment of the present disclosure is to provide a method and an apparatus for performing a training simulation based on a VR immersion level.

A technical object to be achieved by an exemplary embodiment of the present disclosure is to provide a method and an apparatus for processing a VR training related task.

A technical object to be achieved by an exemplary embodiment of the present disclosure is to provide a method for performing VR training based on a VR immersion level and a method and an apparatus for processing an additional task.

An exemplary embodiment of the present disclosure provides a method for operating a virtual reality (VR) device including: performing a VR training operation; acquiring information about an immersion level while performing the VR training operation; comparing the information about an immersion level with a predetermined threshold value; and performing a first operation for improving an immersion level of a user when the information about an immersion level is lower than the predetermined threshold value.

Further, according to an exemplary embodiment of the present disclosure, the first operation includes at least one of an operation of outputting an alarm for the immersion level to the user, an operation of providing a break time to the user during the VR training, and an operation of controlling an output of the VR device based on the characteristic of a virtual reality which is currently being provided and the method further includes: determining whether to continue the VR training by reevaluating the immersion level of the user after the first operation.

Further, according to an exemplary embodiment of the present disclosure, the acquiring of immersion level related information includes: determining whether to satisfy a predetermined condition to acquire information about an immersion level; and acquiring the information about an immersion level when the condition is satisfied, the predetermined condition includes at least one of a timing, a period, a priority of indirect information, and a prerequisite of indirect information.

Further, according to an exemplary embodiment of the present disclosure, the method may further include: acquiring indirect information for immersion level related information; determining validity of the indirect information based on validity determination information set with regard to the indirect information; discarding the indirect information when the indirect information is not valid; and acquiring the information about an immersion level based on the indirect information when the indirect information is valid.

Further, according to an exemplary embodiment of the present disclosure, the method may further include: setting a type of indirect information and a timing for acquiring the immersion level related information, the timing is set among the entire timing of the VR training by a manager in accordance with the importance and the type of the indirect information may be determined based on the characteristic of the virtual reality provided at the timing.

Further, according to an exemplary embodiment of the present disclosure, the acquiring of immersion level related information includes: determining whether a plurality of immersion level information is acquired; determining whether immersion level information which satisfies an absolute condition among the plurality of immersion level information if the plurality of immersion level information is acquired is included; processing the immersion level information which satisfies the absolute condition as the immersion level related information by excluding another immersion level information if immersion level information which satisfies the absolute condition is included; and processing an average value acquired from the plurality of immersion level information as the immersion level related information if the immersion level information which satisfies the absolute condition is not included.

Further, according to an exemplary embodiment of the present disclosure, the method may further include: storing immersion level information and training section information corresponding to a timing when the immersion level information is acquired; determining whether the training section is an essential training section; and performing retraining on the training section based on the determination of the essential training section.

Further, according to an exemplary embodiment of the present disclosure, the performing of a first operation may further include: determining a type of indirect information which is a basis of the immersion level related information; adjusting an output of the VR device based on the type of the indirect information; and determining whether an immersion level of the user is improved in accordance with the adjustment of the output of the VR device.

Another exemplary embodiment of the present disclosure provides a virtual reality (VR) device including: an output unit; and a processor which controls to perform a VR training operation by means of the output unit, acquire information about an immersion level while performing the VR training operation, compare the information about an immersion level with a predetermined threshold value, and perform a first operation for improving an immersion level of a user when the information about an immersion level is lower than the predetermined threshold value.

Further, according to an exemplary embodiment of the present disclosure, the first operation includes at least one of an operation of outputting an alarm for the immersion level to the user, an operation of providing a break time to the user during the VR training, and an operation of controlling an output of the VR device based on the characteristic of a virtual reality which is currently being provided and the processor controls to determine whether to continue the VR training by reevaluating the immersion level of the user after the first operation.

Further, according to an exemplary embodiment of the present disclosure, the processor controls to determine whether to satisfy a predetermined condition to acquire immersion level related information; and acquire the information about an immersion level when the condition is satisfied, and the predetermined condition includes at least one of a timing, a period, a priority of indirect information, and a prerequisite of indirect information.

Further, according to an exemplary embodiment of the present disclosure, the processor controls to acquire indirect information for immersion level related information; determine validity of the indirect information based on validity determination information set with regard to the indirect information; discard the indirect information when the indirect information is not valid; and acquire the information about an immersion level based on the indirect information if the indirect information is valid.

Further, according to an exemplary embodiment of the present disclosure, the processor controls to set a type of indirect information and a timing for acquiring the immersion level related information, the timing is set among the entire timing of the VR training by a manager in accordance with the importance and the type of the indirect information may be determined based on the characteristic of the virtual reality provided at the timing.

Further, according to an exemplary embodiment of the present disclosure, the processor controls to determine whether a plurality of immersion level information is acquired; determine whether immersion level information which satisfies an absolute condition among the plurality of immersion level information if the plurality of immersion level information is acquired is included; process the immersion level information which satisfies the absolute condition as the immersion level related information by excluding another immersion level information if immersion level information which satisfies the absolute condition is included; and process an average value acquired from the plurality of immersion level information as the immersion level related information if the immersion level information which satisfies the absolute condition is not included.

Further, according to an exemplary embodiment of the present disclosure, the processor controls to store immersion level information and training section information corresponding to a timing when the immersion level information is acquired; determine whether the training section is an essential training section, and retrain the training section based on the determination of whether it is an essential training section.

Further, according to an exemplary embodiment of the present disclosure, the processor controls to determine a type of indirect information which is a basis of the immersion level related information; adjust an output of the VR device based on the type of the indirect information; and determine whether the immersion level of the user is improved in accordance with the adjustment of the output of the VR device.

Yet another exemplary embodiment of the present disclosure provides an operating method of a virtual reality (VR) device including: performing a VR training operation; determining whether there is additional information to output while performing the VR training operation; determining whether there is a user input for the additional information output if it is determined that there is the additional information; and providing an operation related to the additional information based on the user input, and the additional information includes instruction information to perform the task of the VR training.

Further, according to an exemplary embodiment of the present disclosure, the method may further include: acquiring user information for providing the additional information; determining a user specific simulation based on the user information, and during the providing of an operation related to the additional information, the user specific simulation is provided.

Further, according to an exemplary embodiment of the present disclosure, the method may further include: acquiring immersion level information of a user who performs the VR training; determining whether the additional information is related to the immersion level information; and determining additional information based on the immersion level information if it is determined that the additional information relates to the immersion level information, and during the providing of an operation related to the additional information, additional information based on the immersion level information is provided.

Further, according to an exemplary embodiment of the present disclosure, the method may further include: setting another user based additional information; and determining whether the another user based additional information is set with regard to the task, and during the providing of operation related to the additional information, if the another user based additional information is set with regard to the task, predetermined another user based additional information is provided, and during the providing of an operation related to the additional information, if the another user based additional information is not set with regard to the task, general additional information related to the task is provided.

Further, according to an exemplary embodiment of the present disclosure, during the determining of whether there is additional information, when a user does not perform the predetermined operation based on a gaze, a movement direction, and a task related first operation of the user who performs the VR training, it is determined that the additional information needs to be provided.

Further, according to an exemplary embodiment of the present disclosure, the method may further include: acquiring immersion level information of a user who performs the VR training; and when the immersion level information of the user exceeds a predetermined threshold level, it is determined whether there is additional information to be output.

Further, according to an exemplary embodiment of the present disclosure, the method may further include: determining indirect information used to acquire the immersion level information; and determining additional information corresponding to the indirect information.

Yet another exemplary embodiment of the present disclosure provides a virtual reality (VR) device including: an output unit; and a processor which controls to perform the VR training operation and determine whether there is additional information to be output during the VR training operation. When it is determined that there is additional information, the processor 260 controls to determine whether there is a user input to output the additional information and provide an operation related to the additional information based on the user input, and the additional information includes instruction information to perform the task of the VR training.

Further, according to an exemplary embodiment of the present disclosure, the processor controls to acquire user information for providing the additional information; determine a user specific simulation based on the user information, and provide the user specific simulation.

Further, according to an exemplary embodiment of the present disclosure, the processor controls to acquire immersion level information of a user who performs the VR training; determine whether the additional information is related to the immersion level information; and determine additional information based on the immersion level information if it is determined that the additional information relates to the immersion level information, and provide additional information based on the immersion level information.

Further, according to an exemplary embodiment of the present disclosure, the processor controls to set another user based additional information, determine whether the another user based additional information is set with regard to the task, provide predetermined another user based additional information if the another user based additional information is set with regard to the task, and provide general additional information related to the task if the another user based additional information is not set with regard to the task.

Further, according to an exemplary embodiment of the present disclosure, when a user does not perform the predetermined operation based on a gaze, a movement direction, and a task related first operation of the user who performs the VR training, the processor determines that the additional information needs to be provided.

Further, according to an exemplary embodiment of the present disclosure, the processor controls to acquire immersion level information of a user who performs the VR training and if the immersion level information of the user exceeds a predetermined threshold level, determine whether there is the additional information to be output.

Further, according to an exemplary embodiment of the present disclosure, the processor controls to determine indirect information used to acquire the immersion level information; and determine additional information corresponding to the indirect information.

Technical objects to be achieved in the exemplary embodiment of the present disclosure are not limited to the aforementioned technical objects, and another not-mentioned technical object will be obviously understood by those skilled in the art from the description below.

According to the exemplary embodiment of the present disclosure, a method and an apparatus for performing an efficient training simulation by utilizing a VR machine may be provided.

Further, according to the exemplary embodiment of the present disclosure, a novel method and apparatus for providing user experience (UX) for a training simulation based on an immersion level acquired by various devices may be provided.

Further, according to the exemplary embodiment of the present disclosure, a method and an apparatus for processing a related task during the VR training may be provided.

According to the exemplary embodiment of the present disclosure, a VR training method based on an immersion level acquired by various devices and a method and an apparatus for processing a task generated during VR training may be provided.

DETAILED DESCRIPTION OF THE EMBODIMENT

Figure 1:
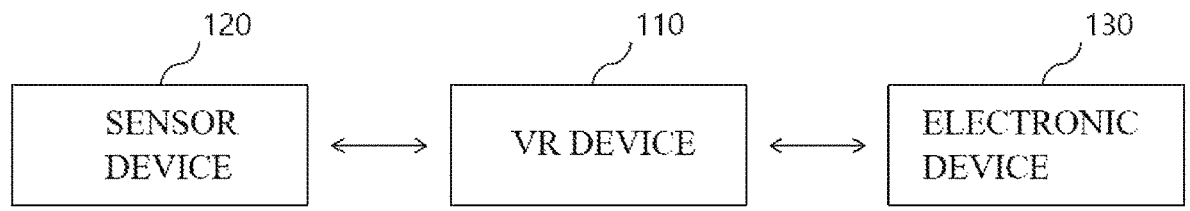
FIG. 1 is a view illustrating a system using a VR according to an exemplary embodiment of the present disclosure.

In the following detailed description, reference is made to the accompanying drawing, which forms a part hereof. The illustrative embodiments described in the detailed description, drawing, and claims are not meant to be limiting. Other embodiments may be utilized, and other changes may be made, without departing from the spirit or scope of the subject matter presented here.

Hereinafter, exemplary embodiments of the present disclosure will be described in detail with reference to the accompanying drawings. In this case, it should be noted that like components are denoted by like reference numerals in the accompanying drawings. Further, when it is determined that a detailed description of related publicly known functions and configurations may obscure the gist of the present disclosure, the detailed description thereof will be omitted.

In the description of the exemplary embodiment in the specification, description of technical contents which are well known in the art and are not directly related to the present disclosure will be omitted. The reason is that unnecessary description is omitted to clearly transmit the gist of the present disclosure without obscuring the gist.

By the same reason, in the accompanying drawings, some parts are exaggerated, omitted, or schematically illustrated. Further, an actual size is not fully reflected to the size of each component. In the drawings, like reference numerals denote like components.

Advantages and features of the present disclosure, and methods for accomplishing the same will be more clearly understood from exemplary embodiments described below with reference to the accompanying drawings. However, the present disclosure is not limited to exemplary embodiment disclosed herein but will be implemented in various forms. The exemplary embodiments are provided to enable the present disclosure to be completely disclosed and the scope of the present disclosure to be easily understood by those skilled in the art to which the present disclosure pertains. Therefore, the present disclosure will be defined only by the scope of the appended claims. Like reference numerals generally denote like elements throughout the specification.

In the various exemplary embodiments of the present disclosure, a virtual reality may refer to a specific environment which is created by an artificial technique using a computer to be similar to the reality, but is not reality or the environment or the technique itself. Further, the virtual reality according to various exemplary embodiments of the present disclosure may correspond to at least one of immersive virtual reality (for example, a virtual reality using specific equipment such as HDM, data gloves, or data suit), tele-robotics (virtual reality in which immersive virtual reality and robot technology are combined), and a desktop virtual reality (stereoscopic eyeglasses or joystick can be added to a computer system).

In the exemplary embodiment of the present disclosure, even though a term of virtual reality or VR may be mainly used for description for the convenience of description, an augmented reality (AR) or a mixed reality (MR) is not excluded and the corresponding technology may also be applied to a system and a method related to the augmented reality or mixed reality.

In various exemplary embodiments of the present disclosure, the VR training may include VR education using a VR device (mining industry education, construction education, etc.), VR practice, VR training (a fire drill, etc.), VR simulation (car driving, airplane driving, etc.), and the like. However, the exemplary embodiment of the present disclosure may be applied not only to the VR training, but also to various environments using various VRs.

In various exemplary embodiments of the present disclosure, information about an immersion level may be used interchangeably with terms such as an immersion level or immersion level information.

FIG. 1 is a view illustrating a system using a VR according to an exemplary embodiment of the present disclosure.

The system using a VR of FIG. 1 may include a VR device 110, a sensor device 120, and an electronic device 130.

The VR device 110 may be a device which provides a virtual reality to a user. For example, the VR device 110 may be a device which displays information about a virtual reality to provide visual information about the virtual reality to the user. Further, the VR device 110 may include a configuration for providing five sense information about the virtual reality. Further, the VR device 110 may include various components which apply a manipulation or an instruction for interaction between a virtual space and a user. A specific configuration of the VR device 110 will be described below with reference to FIG. 2.

The sensor device 120 may sense an external environment (for example, a user state) in accordance with an operation state of the VR device 110, directly display information corresponding to the sensed state to the user, or transmit the information to the VR device 110 or the electronic device 130. The sensor device may include at least one of a gesture sensor, a gyro sensor, an air pressure sensor, a magnetic sensor, an acceleration sensor, a grip sensor, a proximity sensor, a color sensor, an infrared (IR) sensor, a biometric sensor, a temperature sensor, a humidity sensor, an illuminance sensor, and the like. In the meantime, the biometric sensor may include a sensor function for measuring at least one signal of electroencephalogram, respiration, a body temperature, a blood pressure, a blood flow, a current skin resistance, an eyeball, electrocardiogram, electromyogram, a pulse, and the like. In the meantime, the sensor device 120 may be included in the VR device 110.

The electronic device 130 may interwork with the VR device 110 and display an operation state of the VR device 110, and perform user input to control the VR device 110. Further, the electronic device 130 may be a device for providing an alarm in accordance with the state of the VR device 110 and the user. The electronic device 130 may be various electronic devices which may interwork with the VR device 110, such as a terminal, a mobile terminal, a smart phone, a mobile computer, or a wearable device. The electronic device 130 may perform an operation of a training device. The training device may provide information for performing a predetermined training operation to the VR device 110. For example, when the training for a fire drill is performed, the VR device 110 may be controlled to perform a predetermined training operation. In the meantime, the training device may be included in the VR device 110.

Figure 2:
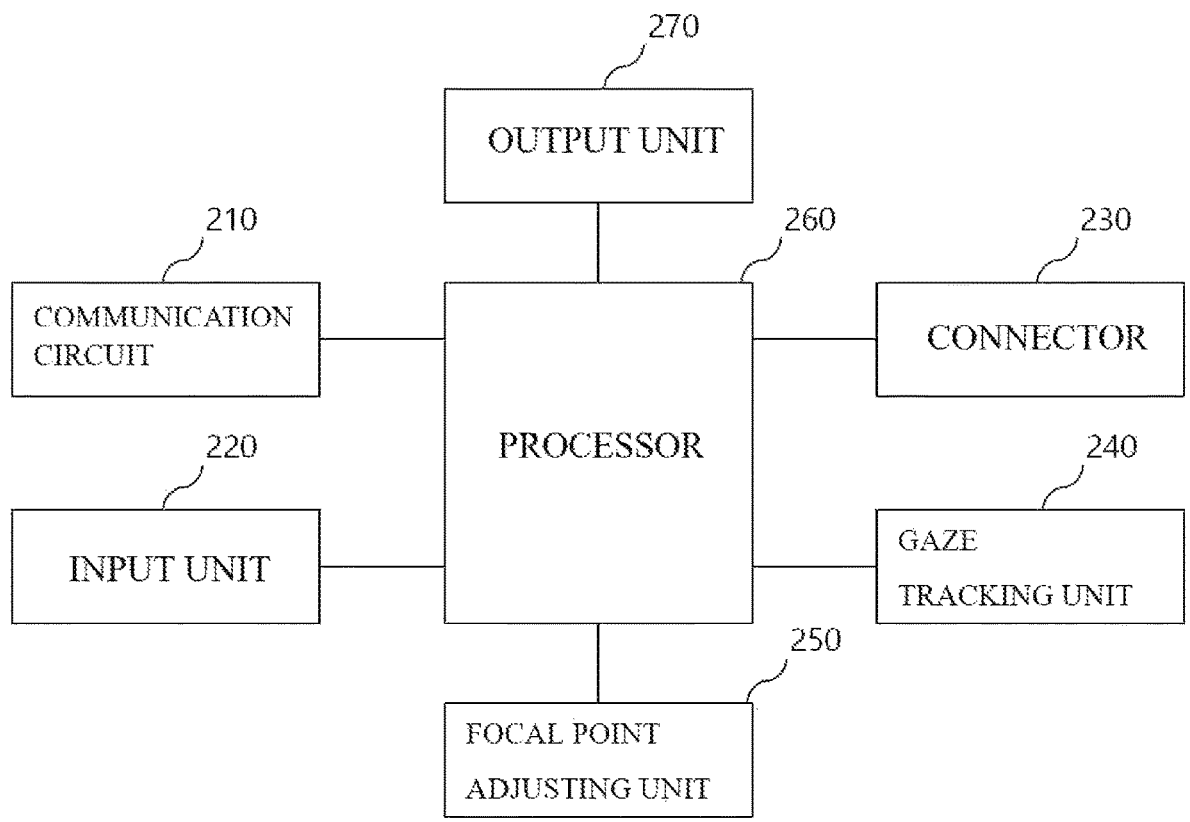
FIG. 2 is a view illustrating a VR device according to an exemplary embodiment of the present disclosure.

FIG. 2 is a view illustrating a VR device according to an exemplary embodiment of the present disclosure.

Referring to FIG. 2, the VR device may include at least one of a communication circuit 210, an input unit 220, a connector 230, a gaze tracking unit 240, a focal point adjusting unit 250, a processor 260, and an output unit 270.

The communication circuit 210 may be a device which allows the VR device to be connected to the electronic device or the sensor device to transmit or receive signals, information, and data.

The input unit 220 may acquire an input for controlling the VR device and transmit the input to the processor 260. The input unit 220 may include a touch pad and a button. The touch pad may recognize a touch input by at least one of a capacitive type, a resistive type, an infrared type, or an ultrasonic type.

The connector 230 may correspond to an interface for charging or connecting the VR device. For example, the connector may include at least one of an electric connection unit, a universal serial bus (USB) wired interface, a high definition multimedia interface (HDMI) wired interface, and the like.

The gaze tracking unit 240 may track the gaze of the user who uses the VR device and transmit the information about the gaze tracking to the processor 260. The gaze tracking unit 240 may include a camera for tracking the gaze.

The focal point adjusting unit 250 may measure an inter-pupil distance (IPD) of the user to adjust a distance of the lens and the display of the VR device, thereby allowing the user to watch a video appropriate to a user's vision.

The processor 260 may control overall operations of the VR device and signal flow between internal components of the VR device and perform data processing. Further, the processor 260 may process signals, data, information, and the like which are transmitted and received between the VR device and the electronic device, the sensor device, and the training device. The processor 260 may be defined as a control unit or a controller and control an operation of the VR device according to various exemplary embodiments of the present disclosure.

Further, according to an exemplary embodiment of the present disclosure, the processor 260 may control to perform the VR training operation by means of the output unit, acquire information about an immersion level during the VR training operation, compare the information about an immersion level with a predetermined threshold value, and perform a first operation for improving the immersion level of the user when the information about an immersion level is lower than the predetermined threshold value. In this case, the first operation may include at least one of an operation of outputting an alarm for the immersion level to the user, an operation of providing a break time to the user during the VR training, and an operation of controlling an output of the VR device based on the characteristic of a virtual reality which is currently being provided. Further, the processor 260 may control to reevaluate the immersion level of the user after performing the first operation to determine whether to continue the VR training.

Further, the processor 260 may control to determine whether to satisfy a predetermined condition to acquire immersion level related information and acquire the information about the immersion level when the condition is satisfied, and the predetermined condition may include at least one of a timing, a period, a priority of indirect information, and a prerequisite of the indirect information.

The processor 260 may control to acquire indirect information for the immersion level related information, determine a validity of the indirect information based on validity determination information set with regard to the indirect information, discard the indirect information if the indirect information is not valid, and acquire information about the immersion level based on the indirect information if the indirect information is valid.

Further, the processor 260 may control to set a type of the indirect information and a timing to acquire the immersion level related information. The timing may be set among the entire timing of the VR training by a manager in accordance with the importance and the type of the indirect information may be determined based on the characteristic of the virtual reality provided at the timing.

Further, the processor 260 may control to determine whether a plurality of immersion level information is acquired and if the plurality of immersion level information is acquired, determine whether immersion level information which satisfies an absolute condition is included in the plurality of immersion level information. If the immersion level information which satisfies the absolute condition is included, the processor may control to exclude the other immersion level information and process the immersion level information which satisfies the absolute condition as the immersion level related information. If the immersion level information which satisfies the absolute condition is not included, the processor may control to process an average value acquired from the plurality of immersion level information as the immersion level related information.

Further, the processor 260 may control to store the immersion level information and training section information corresponding to a timing when the immersion level information is acquired, determine whether the training section is an essential training section, and perform the retraining for the training section based on a determination result of whether to be the essential training section.

Further, the processor 260 may control to determine a type of indirect information which becomes a basis of the immersion level related information, adjust the output of the VR device based on the type of the indirect information, and determine whether the immersion level of the user is improved in accordance with the adjustment of the output of the VR device.

Further, according to an exemplary embodiment of the present disclosure, the processor 260 may process tasks of the VR device. When there is a task related help image, the processor 260 may control to display the help image on a screen and determine whether an instruction of the user related to the help is input. If the user instruction is input, the processor 260 may control to perform an operation corresponding to the user instruction and if the user instruction is not input, may control to disappear the help information after a predetermined time.

Further, according to an exemplary embodiment of the present disclosure, the processor 260 may control to perform the VR training operation and determine whether there is additional information to be output during the VR training operation. When it is determined that there is the additional information, the processor 260 may control to determine whether there is a user input to output the additional information and provide an operation related to the additional information based on the user input. The additional information may include instruction information to perform the task of the VR training.

Further, according to an exemplary embodiment of the present disclosure, the processor 260 may control to acquire user information for providing the additional information, determine a user specific simulation based on the user information, and provide the user specific simulation.

Further, according to an exemplary embodiment of the present disclosure, the processor 260 may control to acquire immersion level information of a user who performs the VR training and determine whether the additional information is related to the immersion level information. When the processor determines that the additional information is related to the immersion level information, the processor 260 may control to determine additional information based on the immersion level information and provide the additional information based on the immersion level information.

Further, according to an exemplary embodiment of the present disclosure, the processor 260 may control to set additional information based on another user and determine whether another user based additional information is set with regard to the task. If the another user based additional information is set with regard to the task, the processor 260 may control to provide predetermined another user based additional information and if the another user based additional information is not set with regard to the task, provide general additional information related to the task. The general additional information may refer to another additional information which is distinguished from another user based additional information in various exemplary embodiments of the present disclosure.

According to an exemplary embodiment of the present disclosure, the processor 260 may control to acquire the immersion level information of the user who performs the VR training and if the immersion level information of the user exceeds a predetermined threshold value, determine whether there is additional information to be output. Further, according to an exemplary embodiment of the present disclosure, the processor 260 may control to determine indirect information used to acquire the immersion level information and determine additional information corresponding to the indirect information.

Further, according to the exemplary embodiment of the present disclosure, when the user may not perform a predetermined operation based on a gaze, a moving direction, and a task related first operation of the user who performs the VR training, the processor 260 may determine that the additional information needs to be provided.

According to an exemplary embodiment of the present disclosure, the processor 260 may control to acquire the immersion level information of the user who performs the VR training and if the immersion level information of the user exceeds a predetermined threshold value, determine whether there is additional information to be output. Further, according to an exemplary embodiment of the present disclosure, the processor 260 may control to determine indirect information used to acquire the immersion level information and determine additional information corresponding to the indirect information.

The output unit 270 may be a device which outputs a virtual reality provided by the VR device to the user. For example, the output unit 270 may output information about at least one of five senses for the virtual reality to the user.

Figure 3:
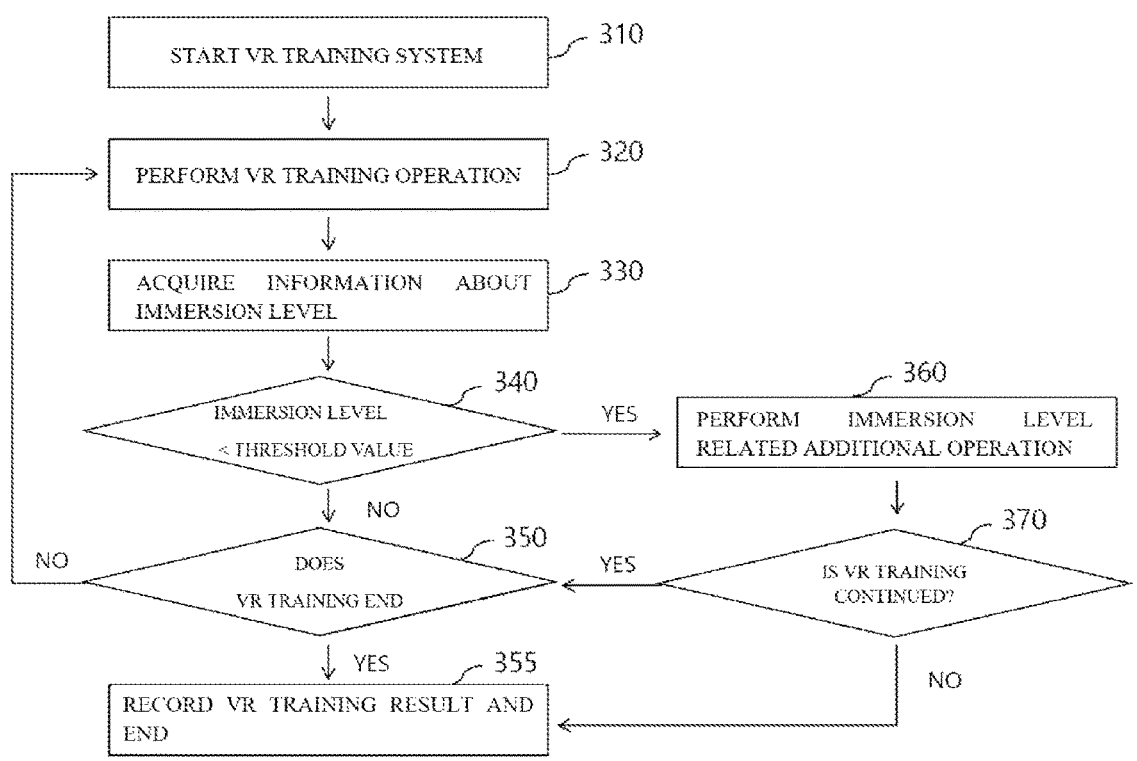
FIG. 3 is a view illustrating an operation of a VR device according to an exemplary embodiment of the present disclosure.

FIG. 3 is a view illustrating an operation of a VR device according to an exemplary embodiment of the present disclosure.

Referring to FIG. 3, in an operation 310, the VR training system may start. The VR training system may start from a VR device or may start in accordance with the control from an electronic device related with the VR device. When the VR training system starts from the VR device, the VR training system may start if a predetermined condition is satisfied (a predetermined time, a predetermined number of members, a predetermined location, or the like) or start in accordance with a starting instruction of the user. When the VR training system starts in accordance with the control of the electronic device related with the VR device, the VR training system may start if the predetermined condition is satisfied or in accordance with a starting instruction of a manager who manages the electronic device. In the meantime, in the exemplary embodiment of FIG. 3, the VR training system has been described as an example, but in various exemplary embodiments of the present disclosure, the VR training system may correspond to an example and various exemplary embodiments of the present disclosure may also be applied to the VR system and various application examples that an immersion level may be applied in the VR system.

In an operation 320, the VR device performs an operation for VR training. The VR device may provide information about a virtual reality corresponding to the VR training to the user. For example, in the case of VR training for the mining industry, a virtual reality for dangerous situations which may occur at the mine site and a drill therefor may be provided. In the case of VR training for a fire drill, a virtual reality for training an emergency measure for the fire or a drill for evacuating from the fire situation by checking an evacuation route may be provided. Further, in the case of VR training for military training such as reserve forces training, various virtual realities which assume military training or wartime situation may be provided. Further, the VR training may be used for training such as various educations or exercises. One user may participate in the VR training to perform the training or a plurality of users participates in the VR training to perform the training together. The user may not only simply immerse in the virtual reality provided from the VR device, but also interact with things implemented in the virtual reality provided by the VR device by performing manipulation or issuing instructions for the virtual reality using an input unit of the VR device or an input device connected to the VR device. The VR device may provide a virtual reality corresponding to the manipulation or the instruction of the user.

In an operation 330, the VR device may acquire information about an immersion level of the user. The immersion level may be directly acquired from the VR device or may be acquired from another electronic device connected to the VR device. The immersion level of the user may correspond to a numerical value representing how much the user who experiences the virtual reality by means of the VR device concentrates on or immerses in the provided virtual reality. The information about the immersion level may be acquired from indirect information for evaluating the immersion level.

The indirect information for evaluating the immersion level may include at least one of various biometric information which may be acquired from the user who uses the VR device. The biometric information may include at least one information of electroencephalogram, respiration, a body temperature, a blood pressure, a blood flow, a current skin resistance, an eyeball, electrocardiogram, electromyogram, a pulse, and the like. The biometric information may be acquired from a sensor included in the VR device or may be acquired from the electronic device connected to the VR device to be provided to the VR device.

Further, the indirect information may include at least one of information acquired from manipulation or input instructions of the user who uses the VR device. For example, the indirect information may include at least one of the number of times inputting an instruction, an instruction input period, an instruction input frequency, a reaction speed of a user, and the like.

Further, the indirect information for determining the immersion level is not limited to the above-described examples, but may further include the other information which may be acquired from the user who uses the VR device.

The VR device may acquire information about the immersion level of the user based on at least one of the indirect information. For example, when pulse information among the biometric information is used, the immersion level may be evaluated based on information when a pulse rate is less than a predetermined threshold value or a change in a pulse for a predetermined time. An immersion level for the other biometric information may be evaluated by directly comparing the magnitude thereof with the predetermined threshold value or based on the information such as a changed amount for a predetermined time. According to various exemplary embodiments of the present disclosure, the predetermined threshold value which is compared with the indirect information may be defined as a first threshold value. The first threshold value may be set to have different values according to a type of the indirect information.

The immersion level for the indirect information acquired by the manipulation or input instruction of the user may be evaluated in a similar manner. For example, the number of times inputting an instruction from the user may be compared with a predetermined threshold value and the immersion level may be evaluated based on information such as a changed amount for the number of times inputting an instruction from the user for a predetermined time.

Although it has been described above that the information about the immersion level is acquired based on the indirect information, the indirect information itself may be used instead of the information about the immersion level. That is, a procedure of acquiring information about the immersion level from the indirect information is omitted, an operation 340 may be performed in accordance with a comparison result of the indirect information and the threshold value.

When valid information about an immersion level is acquired in the operation 330, the VR device may proceed to the operation 340. For example, when at least one information about an immersion level is acquired, it may be determined that valid information about an immersion level is acquired and when information about an immersion level which satisfies a condition set by the user or the manager of the training system is acquired, the VR device may proceed to the operation 340. A specific operation thereof will be described with reference to an additional exemplary embodiment of FIG. 5.

In the operation 340, the VR device may compare information about an immersion level acquired in the operation 330 with threshold value information for an additional operation. The threshold value information for an additional operation is defined as second threshold value information hereinbelow. The second threshold value may be set to have different values according to a type of the indirect information which becomes a basis for acquiring information about an immersion level. The VR device may perform different operations in accordance with a comparison result of acquired information about an immersion level and the second threshold value. In the meantime, there may be a plurality of information about an immersion level acquired by the VR device. In this case, it may be determined whether to perform an operation 350 or an operation 360 depending on whether at least one information about an immersion level satisfies the threshold value condition and it may be determined whether to perform the operation 350 or the operation 360 depending on whether at least one information about an immersion level does not satisfy the threshold value condition. Further, it may be determined whether to satisfy the threshold value condition by applying information about a predetermined priority or a weight to the plurality of information about an immersion level. A specific example using a plurality of weight information will be described with reference to an additional exemplary embodiment of FIG. 7.

When it is determined that the immersion level is higher than the second threshold value, the VR device may proceed to the operation 350. The VR device proceeds to the operation 350 to determine whether the VR training ends. When the VR training does not end, the VR device proceeds to the operation 320 to perform the above-described operations again. When the VR training ends, the VR device proceeds to an operation 355 to end the operation of the VR device. Further, when the operation of the VR device ends, a VR training result may be recorded in the VR device or transmitted to the electronic device connected to the VR device to record the VR training result. A specific operation of recording the VR training result will be described with reference to an additional exemplary embodiment of FIG. 8.

When it is determined that the immersion level is lower than the second threshold value, the VR device may proceed to the operation 360. When the VR device proceeds to the operation 360, the VR device may perform an immersion level related additional operation. In this case, the immersion level of the user is low so that the VR device may perform at least one of an operation for improving the immersion level of the user, an operation for providing a break to the user, an operation for providing an alarm for the immersion level, and the like.

The operation for improving an immersion level may include an operation of changing an output of the VR device. For example, an amount of visual information among virtual reality information of the VR device may be changed. For example, luminance, brightness, saturation, and the like corresponding to the visual information are changed to induce the improvement of the immersion level of the user. For example, when auditory information is changed, a volume of sound is changed to induce the improvement of the immersion level of the user. The operation for improving an immersion level may selectively change visual information, auditory information, or other information in accordance with the characteristic of the virtual reality which is currently being reproduced. Further, the number of outputs which induce the user instruction is increased to induce the improvement of the immersion level of the user. A magnitude of the output may be determined in accordance with the immersion level of the user which has been acquired in advance.

The operation for providing a break to the user may be an operation of stopping the operations of the VR device for a predetermined time or an operation for allowing a user to use the VR device after taking a break for a predetermined time or longer by notifying the break for the predetermined time. The break time may be determined based on the immersion level of the user which has been acquired in advance. The lower the immersion level, the longer the break time may be required. However, even though the VR device starts the operation for providing a break, an input for requesting to reevaluate the immersion level of the user may be input to the VR device and in this case, the VR device reevaluates the immersion level of the user to take a break or go to the operation 320. The operation of providing an alarm to the user may indicate that the current immersion level is equal to or lower than a predetermined threshold value or a step that an efficiency of the VR training is degraded.

In an operation 370, the VR device may determine whether to continue the VR training. For example, the information about the immersion level of the user after the operation 360 may be acquired again and it may be determined whether to proceed the VR training based thereon. When the immersion level acquired in the operation 370 is equal to or lower than a predetermined third threshold value, the VR device additionally may perform the operation 360 again or determine that the VR training is no longer possible to end the procedure. When the VR device ends the procedure, the VR device may proceed to the operation 355. When the immersion level exceeds the predetermined third threshold value, the VR device determines that the VR training can be continued to proceed to the operation 350. The operation 370 may be omitted.

In the meantime, in the exemplary embodiment of FIG. 3, the operation of the VR device when the immersion level of the user is lower than the predetermined threshold value has been described based on the operation 340, but the scope of the present disclosure is not limited thereto and the same may be applied to the over-immersive situation. When the user excessively immerses in the virtual reality provided by the VR device, it may affect the user's safety so that an operation for suppressing an over-immersion situation may be necessary.

For example, in the operation 340, the VR device may determine whether the immersion level exceeds a predetermined threshold value (fourth threshold value) for determining the over-immersion. When the immersion level does not exceed the fourth threshold value, the above-described operation 350 may be performed.

When the immersion level exceeds the fourth threshold value, the VR device may perform the operation 360 and the operation 370 according to the operation 360. In the operation 360, the VR device may perform at least one of operations for notifying the over immersion, providing a break time, and lowering the immersion level of the user.

The operation for lowering an immersion level may include an operation of changing an output of the VR device. For example, an amount of visual information among virtual reality information of the VR device may be changed. For example, luminance, brightness, saturation, and the like corresponding to the visual information are changed to induce the lowering of the immersion level of the user. For example, when auditory information is changed, a volume of sound is changed to induce the lowering of the immersion level of the user. The operation for improving an immersion level may selectively change visual information, auditory information, or other information in accordance with the characteristic of the virtual reality which is currently being reproduced. Further, the number of outputs which induce the user instruction is reduced to induce the improvement of the immersion level of the user. The magnitude of the output provided by the VR device or the input required by the VR device to lower the immersion level of the user may be adjusted in accordance with the immersion level of the user which has been acquired in advance by the above-described method.

The operation for providing a break to the user may be an operation of stopping the operations of the VR device for a predetermined time or an operation for allowing a user to use the VR device after taking a break for a predetermined time or longer by notifying the break for the predetermined time. The break time may be determined based on the immersion level of the user which has been acquired in advance. The higher the immersion level, the longer the break time may be required. However, even though the VR device starts the operation for providing a break, an input for requesting to reevaluate the immersion level of the user may be input to the VR device and in this case, the VR device reevaluates the immersion level of the user to take a break or go to the operation 320. The operation of providing an alarm to the user may indicate that the current immersion level exceeds a predetermined threshold value or a situation that an efficiency of the VR training is degraded or the user may be in danger.

The over-immersion control operation of the user as described above is not limited to the above-described exemplary embodiment and various operations of the present disclosure to be described below may be applied not only to an example with a low immersion level, but also to an over-immersive state that the immersion level exceeds a predetermined threshold value.

Figure 4:
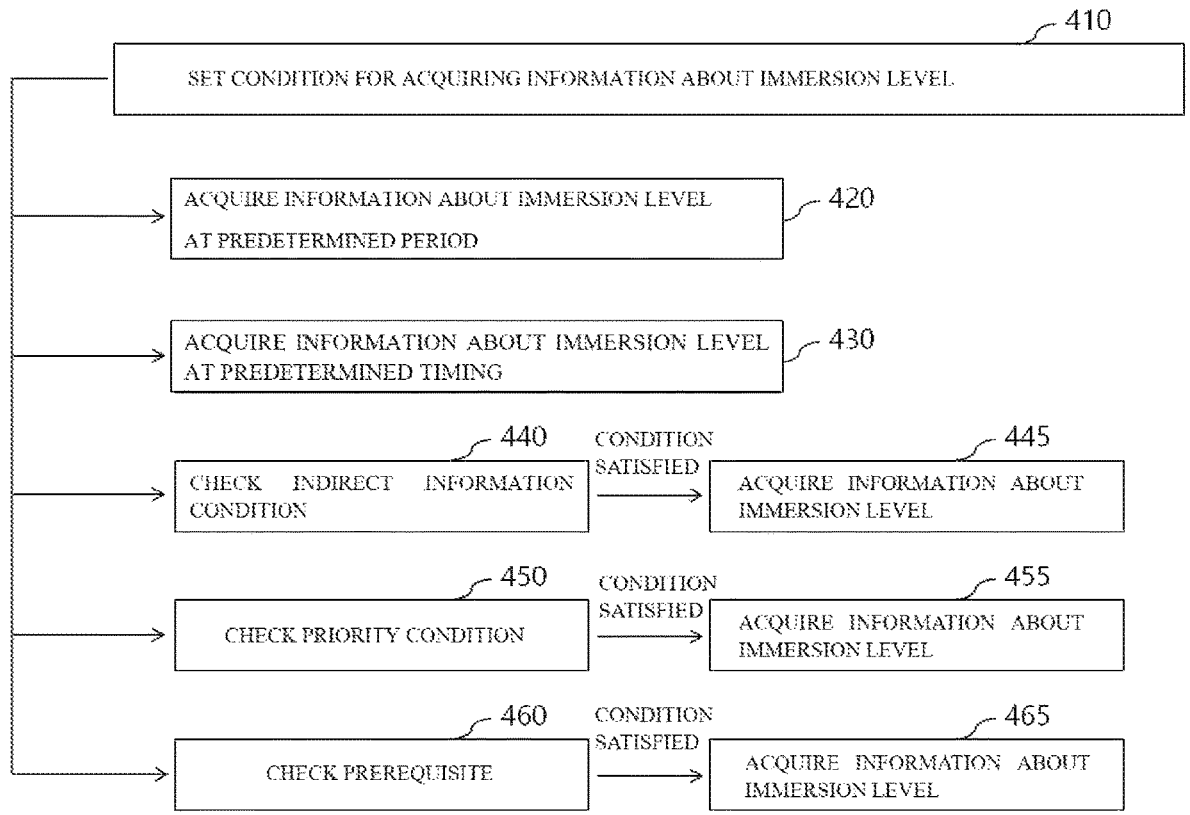
FIG. 4 is a view illustrating an immersion level acquiring method of a VR device according to various exemplary embodiments of the present disclosure.

FIG. 4 is a view illustrating an immersion level acquiring method of a VR device according to various exemplary embodiments of the present disclosure.

The exemplary embodiment of FIG. 4 may be applied as an additional exemplary embodiment for the operation 330 of FIG. 3. Further, the exemplary embodiment of FIG. 4 may be applied to exemplary embodiment of FIG. 11A, 11B, or 13 to be described below.

In an operation 410, a condition for acquiring information about an immersion level may be set. The condition may be at least one of settings for a predetermined period, a predetermined specific timing, a predetermined level of indirect information, a priority of the indirect information, and a prerequisite of the indirect information.

For example, when the predetermined condition is a period condition, the VR device proceeds to an operation 420 and in the operation 420, the VR device determines whether it is a predetermined period for acquiring information about an immersion level. When it is determined to be the predetermined period, the VR device may acquire information about an immersion level from at least one of indirect information for biometric signals and indirect information for a user instruction input.

For example, when a predetermined specific timing is a condition, the VR device proceeds to an operation 430. In the operation 430, the VR device determines whether it is a specific timing for acquiring information about an immersion level. The specific timing may be non-periodic and may be determined by an arbitrary timing in accordance with the characteristic of the virtual reality provided by the VR device or the characteristic of the VR training system. For example, it may be set to acquire information about an immersion level at an important timing in the VR training system or a timing at which a specific virtual reality to move to a next step is provided.

When a predetermined level of the indirect information is a condition, the VR device proceeds to an operation 440. When the predetermined level of the indirect information satisfies a predetermined condition, the VR device may acquire information about an immersion level. For example, when a movement of an eyeball is a predetermined condition, it may be determined that information about an immersion level needs to be acquired when the movement of the eyeball is equal to or less than a predetermined movement. When it is determined that the information about an immersion level is necessary in accordance with the operation 440, the VR device proceeds to an operation 445 to acquire information about an immersion level from at least one of indirect information about a biometric signal and indirect information about a user instruction information input or predetermined indirect information.

In the meantime, the first indirect information used in the operation 440 and the second indirect information used in the operation 445 may be indirect information for mutual complement. For example, when it is determined that information about an immersion level is necessary based on the movement of the eyeball in the operation 440, in the operation 445, information about an immersion level may be acquired by including at least one of indirect information about the user instruction input rather than the biometric signal. Further, when it is determined that the information about an immersion level is necessary based on the movement of eyeball in the operation 440, in the operation 445, information about an immersion level may be acquired by including at least one biometric signal other than visual information.

For example, when the priority of the indirect information is a condition, the VR device proceeds to an operation 450. When the predetermined level of the indirect information of the priority satisfies a predetermined condition in the operation 450, the VR device may proceed to an operation 455 to acquire information about an immersion level. For example, it may be determined that the priority of the biometric signal is higher than that of the user instruction input and it may be determined that the priority of the user instruction input is higher than that of the biometric signal. When the priority of the biometric signal is high, even though there is a very low input for the user instruction input, the predetermined condition is not satisfied in the operation 450 so that the VR device does not proceed to the operation 455 and the VR device does not acquire the information about an immersion level. When the level of the indirect information related to the biometric signal satisfies the predetermined condition, the VR device determines that the condition of the operation 450 is satisfied to proceed to the operation 455 and the VR device additionally may acquire information about an immersion level from the indirect information about the biometric signal or the user instruction input.

For example, when the prerequisite of the indirect information is a condition for acquiring information about the immersion level, the VR device proceeds to an operation 460. When the predetermined prerequisite is satisfied in the operation 460, the VR device proceeds to an operation 465 to acquire information about an immersion level. For example, when the predetermined condition related to the biometric signal is satisfied, a prerequisite may be set to acquire indirect information about an input for the user instruction and when the predetermined condition for the user instruction input is satisfied, the prerequisite may be set to acquire information related to the biometric signal. For example, when a heart rate as a biometric signal is equal to or lower than a predetermined threshold value, it is determined whether the frequency of the user instruction input is equal to or lower than a predetermined threshold value and when two conditions are satisfied, the VR device proceeds to the operation 465 to acquire information about an immersion level.

In the above-described VR device, a condition or a setting for acquiring information about an immersion level may be set in accordance with a setting of the VR device, a setting of the VR training system, an input of a manager of the VR training system, or the like. Further, it may be determined in accordance with the type of virtual reality provided by the VR device. For example, when the participation of the user of the virtual reality provided by the VR device or the instruction input of the user is not requested or a frequency thereof is significantly low, a condition, a priority, and a prerequisite for the biometric signal may be set in consideration of the characteristic and information about an immersion level may be acquired. For example, when the virtual reality provided by the VR device consistently requires an input of the instruction of the user, the input of the instruction of the user may be set as a basic condition, a priority, or a prerequisite.

In the meantime, in the above description, for the convenience of description, conditions of 420, 430, 440, 450, and 460 have been described individually, but at least two conditions of the above-described conditions may be combined to be used.

In various exemplary embodiments of the present disclosure, there may be a limit in the sensor of the VR device. Accordingly, when information about the user instruction input is acquired by the VR device, the VR device may request the connected electronic device to provide the user biometric information and the VR device may receive information collected from an electronic device including a sensor or a sensor which is capable of measuring biometric signal of the user from the electronic device to acquire the information. Further, the user biometric information may be received at a predetermined period or whenever a specific event occurs, but may be considered only when a specific condition for the user instruction input is satisfied. In contrast, it may be considered to determine the user instruction input when a specific condition for the biometric signal is satisfied and in this case, the type of the indirect information may be set in advance. Further, when specific information is collected while monitoring only a part of the biometric signal or a part of the user instruction, another biometric information or another user instruction information may be collected. The method for acquiring information about an immersion level according to various exemplary embodiments of the present disclosure is not limited to the above-described example.

Figure 5:
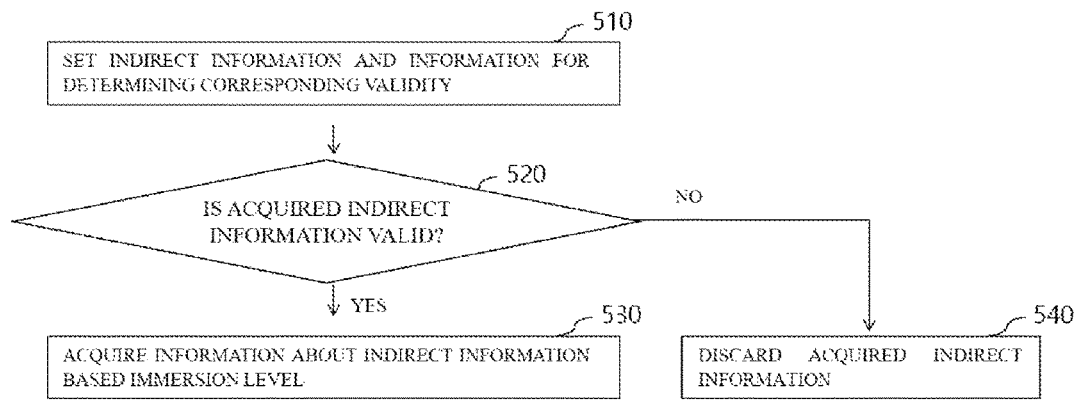
FIG. 5 is a view illustrating a method for determining whether a VR device according to various exemplary embodiments of the present disclosure acquires valid information about an immersion level.

FIG. 5 is a view illustrating a method for determining whether a VR device according to various exemplary embodiments of the present disclosure acquires valid information about an immersion level.

The indirect information used to determine an immersion level may not always be valid. Invalid indirect information may be acquired due to a defect of the electronic device or a defect of the sensor and information about an immersion level acquired from the invalid indirect information may be determined to be invalid. For example, it is difficult to determine that indirect information such as a heart rate of 0 and a body temperature of 30 degrees or lower is a valid biometric signal. Therefore, when the immersion level is determined and the VR device is controlled based thereon, it may not correspond to the gist of the exemplary embodiment of the present disclosure using an immersion level. Accordingly, a valid range for each indirect information may be set in advance and if information out of the valid range is collected, it is not determined that valid information about an immersion level is collected.

In an operation 510, a type of indirect information to be used to acquire an immersion level in the VR device and validity determination information may be set. When the validity determination information is set to be a value in a specific range and the value is out of the specific range, it may be determined that the information is not valid. When the information is set to be a specific value and is equal to or lower than a specific value or equal to or higher than a specific value, it may be determined that the information is not valid. The information may be the number of inputs for a predetermined period (for example, 1000 times of input per one minute, etc.).

For example, as the indirect information, a temperature of the biometric signal is set in a specific range of 35 to 42 degrees Celsius, a pulse rate is set to be 30 BPM (beats per minute), and 10 times or more of input for one second as a user input may be set as validity determination information corresponding to the indirect information.

When the VR device acquires indirect information, in an operation 520, the VR device may determine whether the acquired indirect information is predetermined indirect information related to the determination of the validity. When the information is the predetermined indirect information, it may be determined whether the corresponding information is valid information using the validity determination information corresponding to the indirect information. For example, when body temperature information acquired as indirect information is 20 degrees Celsius, the temperature information is out of the predetermined range so that the information may be determined to be invalid. For example, when the pulse rate acquired as indirect information is 50 BPM, the pulse rate is a value higher than a predetermined threshold value so that the indirect information may be determined to be valid. For example, when the number of times inputting user instruction per second acquired as indirect information is 30, it exceeds a predetermined condition so that there may be a problem in the input device and it may be determined that the indirect information is not valid.

When it is determined that the indirect information is valid, the VR device proceeds to an operation 530. In the operation 530, the VR device may acquire information about immersion level using the acquired indirect information.

When it is determined that the indirect information is not valid, the VR device proceeds to an operation 540. In the operation 540, since the acquired indirect information is not valid, the VR device discards the indirect information and does not trigger information for acquiring immersion level information based on the corresponding indirect information. When the invalid indirect information is a prerequisite for acquiring information about an immersion level according to various exemplary embodiments of the present disclosure, it may be notified that the prerequisite needs to be reset and the condition is excluded and only the other indirect information may be used when the immersion level related operation is performed.

However, even though one or more invalid indirect information is collected, when another valid information is collected, the information about an immersion level may be acquired based on the valid indirect information.

Figure 6:
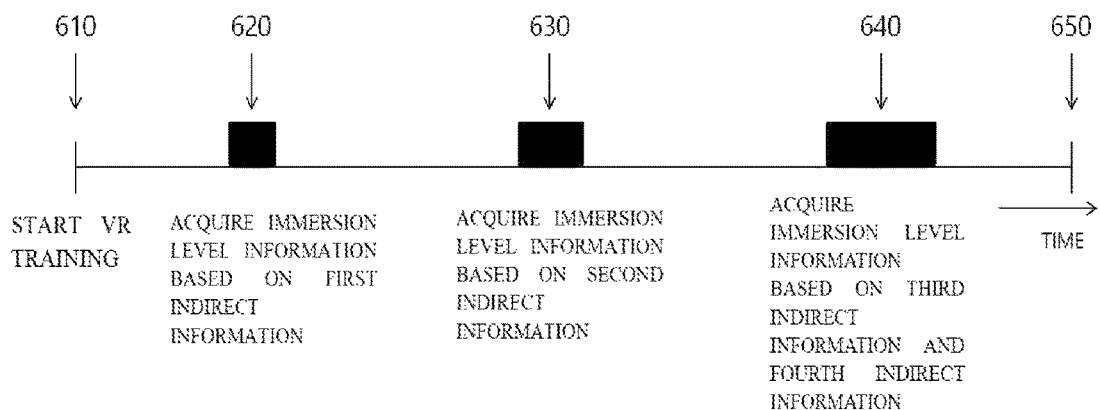
FIG. 6 is a view illustrating a method for setting a timing for acquiring an immersion level of a VR device according to various exemplary embodiments of the present disclosure.

FIG. 6 is a view illustrating a method for setting a timing for acquiring an immersion level of a VR device according to various exemplary embodiments of the present disclosure.

When the immersion level is always acquired or a timing to acquire the immersion level is determined depending on the situation of the user (a biometric signal of the user or an instruction input of the user), the manager of the VR training system may not reflect the requirements. Further, when the situations of the user are always monitored, it may act as a load on the VR device. Therefore, a timing or a condition for acquiring an immersion level may be set in advance in accordance with the setting of the VR training manager or the setting of the user.

When the immersion level information is acquired using indirect information which is the most appropriate to evaluate an immersion level in accordance with an environment provided by the VR device at a timing desired by the manager, the efficiency according to various exemplary embodiments of the present disclosure may be improved.

For example, in FIG. 6, VR training designed to start the VR training at a timing 610 and end the VR training at a timing 650 is assumed. The VR training may be set to acquire information about an immersion level based on first indirect information at a timing 620, set to acquire information about an immersion level based on second indirect information at a timing 630, and set to acquire information about an immersion level based on third indirect information and fourth indirect information at a timing 640.

For example, at the timing 620, visual information provided by the VR device may be the most important timing and as first information, indirect information related to the visual information such as movement of an eyeball or a condition of a pupil may be set. For example, at the timing 630, when the user instruction input in accordance with the participation of the user is most actively requested, the user instruction input related to the user participation may be set as indirect information. Further, not only one indirect information is necessarily set, so that the third indirect information and the fourth indirect information may also be considered together as at the timing 640.

In the above description, a section or a timing to acquire the immersion level related information may be set by the manager in accordance with the importance among the overall timing of the VR training, and the type of the indirect information may be determined by the VR device based on the characteristic of the virtual reality provided at the timing. Further, it is not excluded that the type of the indirect information is set by the manager.

The manager or the user may set a section in which the concentration of the user is important in advance in accordance with the setting as described above and determine the immersion level in the corresponding section to control the operation of the VR device, thereby achieving a higher training effect.

Figure 7:
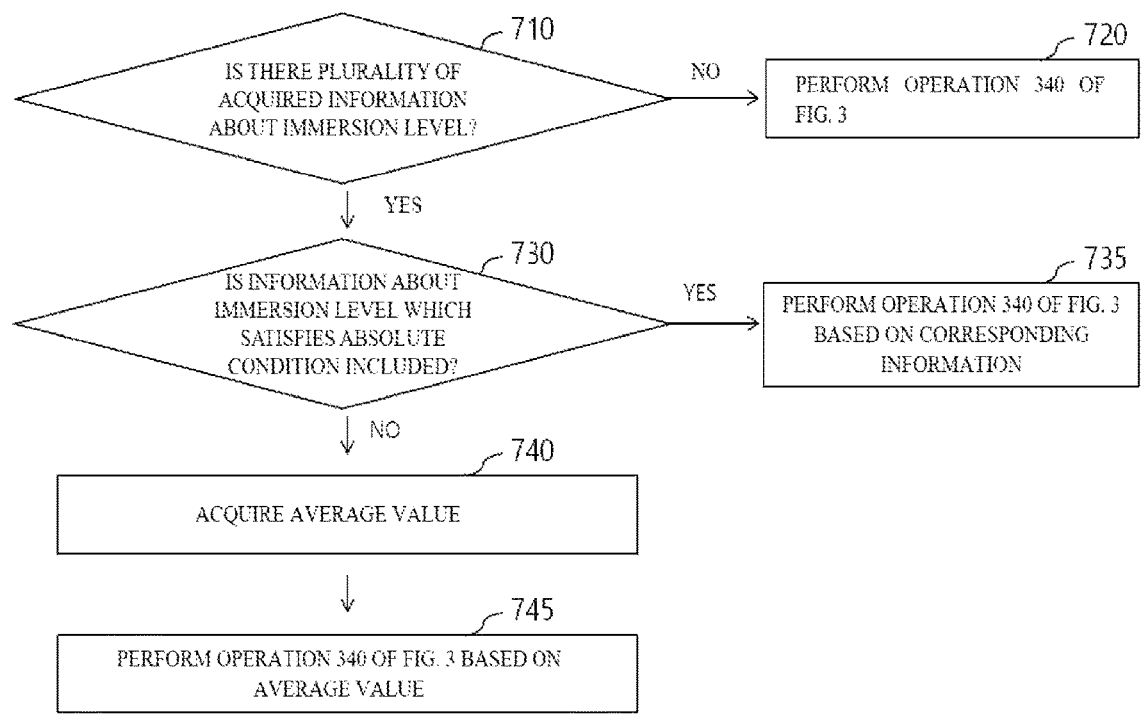
FIG. 7 is a view illustrating a method for determining whether a threshold value condition is satisfied based on a plurality of information about an immersion level according to various exemplary embodiments of the present disclosure.

FIG. 7 is a view illustrating a method for determining whether a threshold value condition is satisfied based on a plurality of information about an immersion level according to various exemplary embodiments of the present disclosure.

In an operation 710, the VR device determines whether there is a plurality of information about an immersion level acquired at a specific timing or a specific section. The information about an immersion level acquired from different indirect information may be determined as a plurality of information about an immersion level for different immersion levels. When the information is not plural, the VR device proceeds to an operation 720 and performs the operation 340 of FIG. 3 using the information about an immersion level and threshold value information corresponding to the corresponding information.

When there is a plurality of information about an immersion level, the VR device proceeds to an operation 730 to determine whether information about an immersion level which satisfies an absolute condition is included. The absolute condition refers to a condition that when information about an immersion level satisfies a predetermined condition, the other condition about the immersion level does not need to be considered. For example, when information about a pupil is an absolute condition but the information about a pupil is not input for a predetermined time, it may be determined that the user is sleeping or the user cannot receive visual information about the virtual reality so that the other information about an immersion level may not be determined. When information about an immersion level which satisfies the absolute condition is included, the VR device proceeds to an operation 735. In the operation 735, even though the other information about an immersion level is acquired, the VR device may perform an operation corresponding to the operation 340 of FIG. 3 using information about an immersion level corresponding to the absolute condition without considering the other information.

When information about an immersion level which satisfies the absolute condition is not included, the VR device proceeds to an operation 740. When the VR device proceeds to the operation 740, the VR device may calculate average immersion level information using a priority or a weight condition set for each information about an immersion level. Thereafter, the VR device proceeds to an operation 745 to perform an operation corresponding to the operation 340 of FIG. 3 using the average immersion level information. For example, the number of information about immersion level to be used for averaging may be set and the information about an immersion level with a higher priority may be selected for averaging using the priority. Further, when there is a weight, the weight may be applied to every information about an immersion level during the calculation for averaging.

In the exemplary embodiment of FIG. 7, the operation 730 and the operation 735 may be omitted.

In the meantime, when a plurality of users participates in the VR training, a plurality of information about immersion levels may be acquired from a plurality of users and in this case, the method of processing a plurality of information about immersion levels may be applied in the same way.

Figure 8:
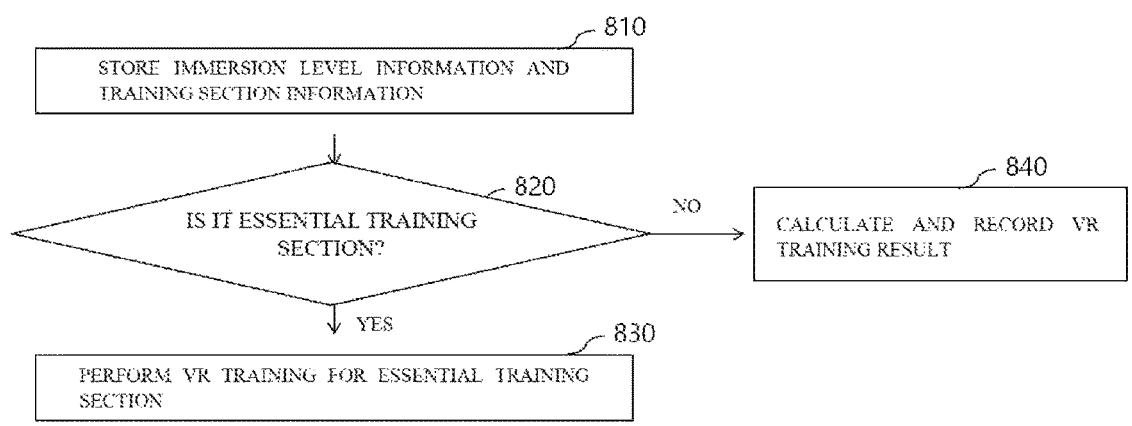
FIG. 8 is a view illustrating a method for recording a VR training result according to various exemplary embodiments of the present disclosure.

FIG. 8 is a view illustrating a method for recording a VR training result according to various exemplary embodiments of the present disclosure.

The VR device may record a VR training result. It may be reasonable to re-perform VR training for sections where the user's immersion level is lowered. To this end, when a specific event related to the immersion level of the user occurs, the VR training device may input a result in the corresponding section of the VR training and perform an operation of additionally providing evaluation of the user or the VR training based on the input result.

In an operation 810, when a specific event for an immersion level occurs, the VR device may determine a VR training section corresponding to the immersion level and store information about the section. For example, in the specific event, the immersion level is equal to or lower than a predetermined threshold value and in the section, an immersion level is equal to or lower than a predetermined threshold value.

In an operation 820, the VR device may determine whether the immersion level lowered section collected in the operation 810 is an essential training section. When it is determined as an essential training section, the VR device proceeds to an operation 830 to start the VR training again for the corresponding section. Further, it may be recorded that the VR training is not be completed due to the omission of the essential training section. When the VR training is not completed, the user needs to perform the VR training again for the corresponding section later.

When it is not determined as an essential training section, the VR device proceeds to an operation 840. In the operation 840, the VR device may calculate a VR training result of the user and record the training result. When the immersion level in a specific section is low but the calculated VR training result satisfies a predetermined condition, it is determined that the VR training has been successful, and it may be recorded. When an immersion level is low multiple times or for a long time so that the calculated VR training result does not satisfy the predetermined condition, it is determined that the VR training has failed, and it may be recorded.

Figure 9:
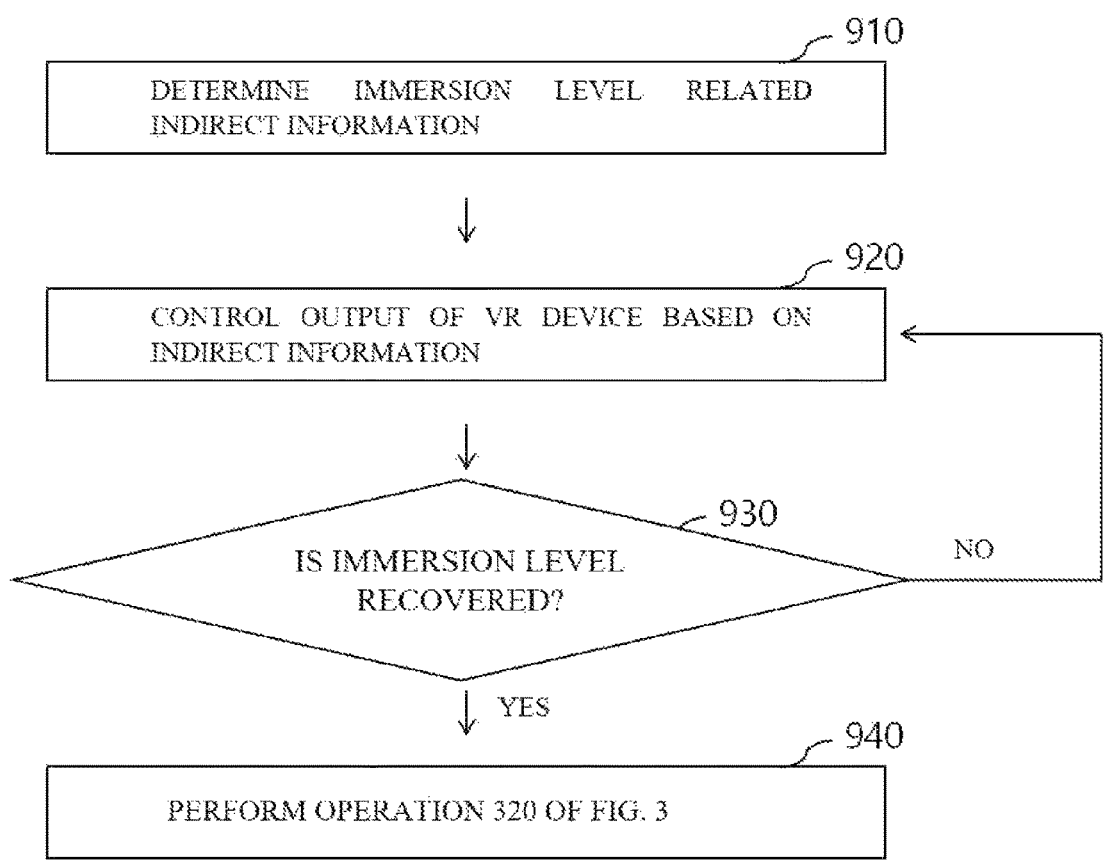
FIG. 9 is a view illustrating a method for controlling sequential VR outputs based on an immersion level according to various exemplary embodiments of the present disclosure.

FIG. 9 is a view illustrating a method for controlling sequential VR outputs based on an immersion level according to various exemplary embodiments of the present disclosure. Operations of FIG. 9 may be applied as immersion level related operations in an exemplary embodiment of FIG. 11A or 11B.

In an operation 910, the VR device may determine a type of indirect information with an immersion level which is equal to or lower than a predetermined threshold value. For example, when the VR device determines that an immersion level based on an eyeball movement is equal to or lower than the predetermined threshold value, the movement of the eyeball or visual information relevance may be determined.

In an operation 920, the VR device may control an output of the VR device based on a type of determined indirect information. For example, the indirect information relates to the movement of eyeball or visual information, the VR device may control an output amount of visual information which provides virtual reality or control an output for stimulating the movement of the eyeball or the vision of the user. For example, luminance, saturation, brightness, or a screen size is adjusted to control an output amount related to the visual information.

Further, the VR device may specifically request the user input. For example, the VR device may induce the eyeball movement of the user. For example, the VR device may induce the user to move the eyeball up and down and left and right. Further, the VR device may instruct n or more times of user inputs.

In an operation 930, the VR device acquires information about an immersion level of the user again and then determines whether the acquired immersion level is equal to or lower than a predetermined threshold value. When the immersion level exceeds the threshold value, the VR device proceeds to an operation 940 and in this case, the immersion level is recovered to a normal state so that the VR device may perform an operation corresponding to the operation 320 of FIG. 3. When the immersion level exceeds the threshold value, the VR device proceeds to an operation 940 and in this case, the immersion level is recovered to a normal state so that the VR device may perform an operation corresponding to an operation 1120 of FIG. 11A.

When the acquired immersion level is equal to or lower than the threshold value, the immersion level is not recovered so that the VR device may additionally perform an operation 920. When the operation 920 is performed, the VR device may change an amount of output or a type of output. For example, when an output is changed with regard to the visual information in a previous operation, an output of auditory information may be additionally changed, and an output change amount of the visual information may be adjusted to be larger.

According to the method as described above, in the present disclosure, the VR device may identify indirect information with an abnormal immersion level, change the output of the VR device based on the indirect information, and change an output of the VR device related to the indirect information which affects the current immersion level to allow a user to recover an immersion level within a short time.

Figure 10:
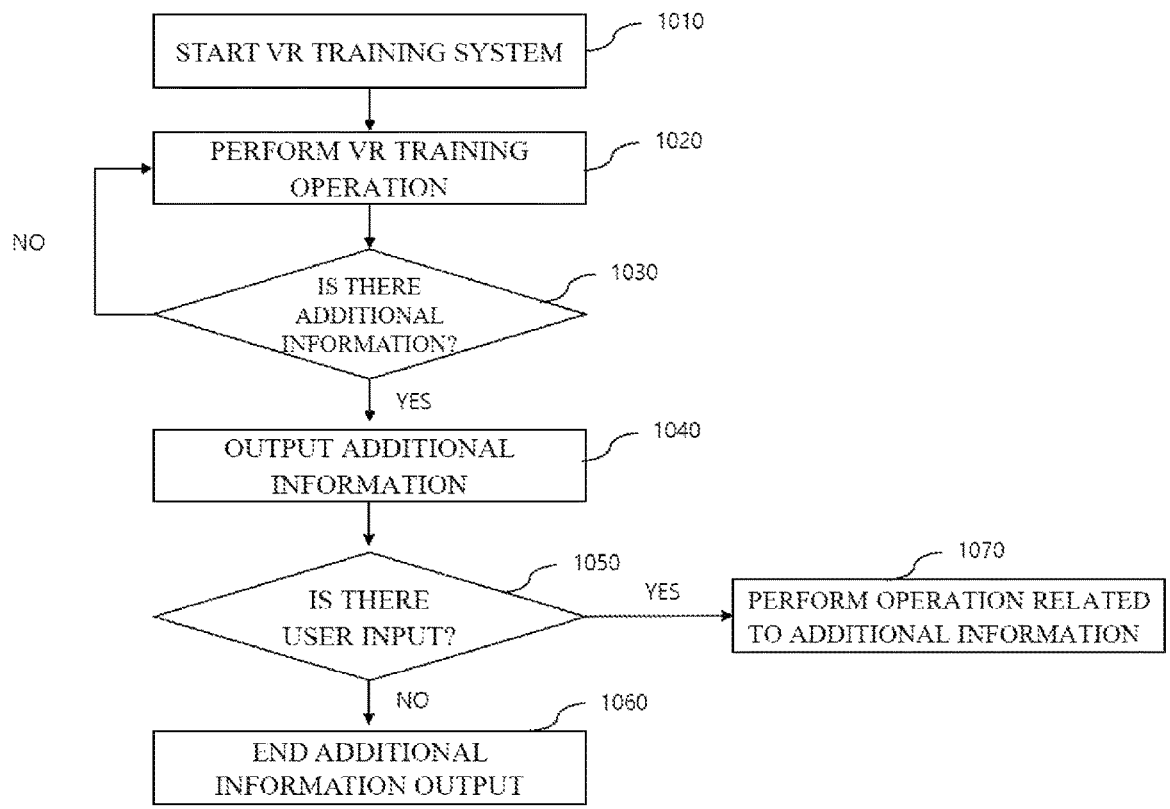
FIG. 10 is a view illustrating an operation of a VR device with regard to task processing according to various exemplary embodiments of the present disclosure.

FIG. 10 is a view illustrating an operation of a VR device with regard to task processing according to various exemplary embodiments of the present disclosure. An exemplary embodiment of FIG. 10 may provide a method of efficiently managing the VR training by providing additional information to a user who uses a VR device. It may be difficult for a user who participates in a virtual reality to determine which task needs to be performed at a specific timing. When predetermined additional information is provided in accordance with a task which needs to be performed by the user, the user who is experiencing the virtual reality may improve the efficiency of the VR training.

Referring to FIG. 10, in an operation 1010, the VR training system may start. The VR training system may start from a VR device or may start in accordance with the control from an electronic device related with the VR device. When the VR training system starts from the VR device, the VR training system may start if a predetermined condition is satisfied (a predetermined time, a predetermined number of members, or a predetermined location), or start in accordance with a starting instruction of the user. When the VR training system starts in accordance with the control of the electronic device related with the electronic device, the VR training system may start if the predetermined condition is satisfied or in accordance with a starting instruction of a manager who manages the electronic device. In the meantime, in the exemplary embodiment of FIG. 10, the VR training system has been described as an example, but in various exemplary embodiments of the present disclosure, the VR training system may correspond to an example and various exemplary embodiments of the present disclosure may also be applied to the VR system and various application examples that an immersion level may be applied in the VR system.

In an operation 1020, the VR device performs an operation for VR training. The VR device may provide information about a virtual reality corresponding to the VR training to the user. For example, in the case of VR training for the mining industry, a virtual reality for dangerous situations which may occur at the mine site and a drill therefor may be provided. In the case of VR training for fire drill, a virtual reality for training an emergency measure for the fire or a drill for evacuating from the fire situation by checking an evacuation route may be provided. Further, in the case of VR training for military training such as reserve forces training, various virtual realities which assume military training or wartime situation may be provided. Further, the VR training may be used for training various educations or trainings. One user may participate in the VR training to perform the training or a plurality of users participates in the VR training to perform the training together. The user may not only simply immerse in the virtual reality provided from the VR device, but also interact with things implemented in the virtual reality provided by the VR device by performing manipulation or issuing instructions for the virtual reality using an input unit of the VR device or an input device connected to the VR device. The VR device may provide a virtual reality corresponding to the manipulation or the instruction of the user.

In an operation 1030, the VR device may check whether there is additional information to be provided to a user. The additional information may be displayed to overlap a virtual reality of the VR device or may be output as a voice and may be an output for an instruction related to a task which needs to be performed by a user who uses the VR device by various methods.

In the exemplary embodiment of the present disclosure, the task may correspond to a specific task or project which needs to be performed by the user in a VR training situation provided by the VR device. The specific task or project may be determined in accordance with the situation of the VR training. For example, when the task is determined by a time, there may be a task which needs to be performed at a specific timing of the VR training and when the task is based on the location, there may be a task which needs to be performed based on a specific location in the virtual reality provided by the VR device. Further, when the task is based on a gaze on which the user keeps an eye in the virtual reality, the task may be determined in accordance with a target of the virtual reality on which the user keeps an eye. Further, when the user completes a specific task, there may be a next task. The task may be determined in accordance with the choice of the user or a task which needs to be performed may be determined in accordance with the choice or the instruction of the manager who manages the VR device and the VR training. Further, a task needed to be performed may be determined in accordance with a combination of various methods to determine the task. For example, when a condition for a specific gaze at a specific timing in a specific location is satisfied, a task to be performed may be determined.

In the meantime, the additional information may be provided in accordance with the timing of the task to be performed or it may be determined whether to provide additional information based on a user's situation. For example, when the additional information is provided in accordance with the timing of the task, additional information may be provided before the task to be performed. When the additional information is provided based on the user's situation, if the user performs the task but does not perform a predetermined operation for the task, it may be determined that the additional information needs to be provided. For example, the additional information may be provided in consideration of user's situation, for example, when the user cannot perform a task related operation for a predetermined time, when the gaze of the user is directed to a place which is not related to the current task, or when the user moves to a location which is not related to the current task. Further, when a plurality of users participates in the VR training, if the plurality of users satisfies a predetermined condition, it may be determined that additional information is necessary. For example, in the case of training to place a plurality of users in a specific location, when all users are completely placed in a first place, additional information for moving to a second location may be provided. Further, when a plurality of users completes a predetermined percentage or more of a mission for a specific task, additional information for a next task may be provided.

When there is no additional information to be provided to the user, the VR device proceeds to the operation 1020 and when there is additional information to be provided to the user, the VR device proceeds to an operation 1040.

In the operation 1040, the VR device may output additional information. The additional information may be displayed to overlap a virtual reality of the VR device or may be output as a voice and may be an output for an instruction related to a task which needs to be performed by a user who uses the VR device by various methods. In the following description, it is assumed that help information is output as visual information in VR training related to a manufacturing method for making products. However, this is for the purpose of convenience of description, but the scope of the exemplary embodiment of the present disclosure is not limited thereto.

In the operation 1040, the VR device may output additional information on the virtual reality, which may be input to the user as visual information. The additional information may be displayed to overlap the virtual reality which is watched by the user. In steps A, B, and C for making products, when it is assumed that the user completes the step A, a task to be performed by the user next corresponds to an operation of the step B. In this case, the VR device may output additional information related to the step B which is a task to be performed.

In the meantime, the additional information may be information for explanation related to a task to be performed by the user. The additional information may be texts, images, or videos and may correspond to a simulation of the virtual reality. Further, the additional information may be an interface which requests user input to output at least one of the additional information described above or corresponding information. For example, some users may need an explanation of the task to be performed in accordance with the additional information and some users may not need an explanation of the task. Therefore, the additional information may be to output an interface for an input of the user who wants the additional information.

When the additional information is an explanation for a task to be performed by the user and in the operation 1040, corresponding contents are output, an operation 1050 may be omitted. When the additional information is an interface for the explained user input, the VR device proceeds to the operation 1050.

In the operation 1050, the VR device may determine whether there is a user input in the interface for the user input output related to the additional information. When there is no user input for a predetermined time or when an input that the user disagrees with the output of the additional information is input, the VR device proceeds to an operation 1060 to end the output of the additional information.

When there is a user input or when an input that the user agrees with the output of the additional information is input, the VR device proceeds to an operation 1070 to perform an operation related to the additional information. For example, a text to explain a task may be displayed, an image may be displayed, a video may be displayed, or a simulation process of the virtual reality may be displayed. For example, when a task to be performed is the step B of the product manufacturing process, the explanation of the step B is displayed with a text, a procedure related to the step B is displayed with an image, a procedure related to the step B is displayed with a video, or a procedure related to the step B is displayed by a simulation of the virtual reality.

The operation related to the additional information may be provided by levels. When the user does not appropriately perform the specific task, additional information such as a text or voice is provided as a first level and when the user fails again, image or video based additional information may be provided as a second level. Further, when the user fails again, virtual reality simulation based additional information may be provided as a third level. As described above, a level-based additional information related operation may be performed in accordance with a task processing capability of the user.

When the operation related to the additional information is displayed by the simulation of the virtual reality, a characteristic of the user who currently uses the VR device is identified to provide a simulation process in accordance with the characteristic of the current user. A specific process thereof will be described with reference to FIG. 5.

In the meantime, additional information providing or an additional information providing related operation may lower the immersion level of the virtual reality so that it is necessary to complete or cancel the operation at an appropriate timing. The additional information related operation may be cancelled when the user performs an operation corresponding to a predetermined condition or a predetermined condition is satisfied. For example, when the VR device determines that the gaze of the user checks the additional information, the additional information related operation may be cancelled. Further, when a predetermined time elapses, when playback of the additional information ends, or when a user performs a predetermined level or higher of operation with regard to the additional information related operation, the additional information related operation may be terminated or cancelled.

After the operation 1060 or 1070, the VR device may perform a task related operation. That is, the VR device may provide virtual reality information related to a task to be performed by a user and allow the user to perform the task in the virtual reality. The user may more efficiently handle the task based on the additional information related operation provided in the operation 1070 and thus the effect of the VR training may be improved.

Figure 11A:
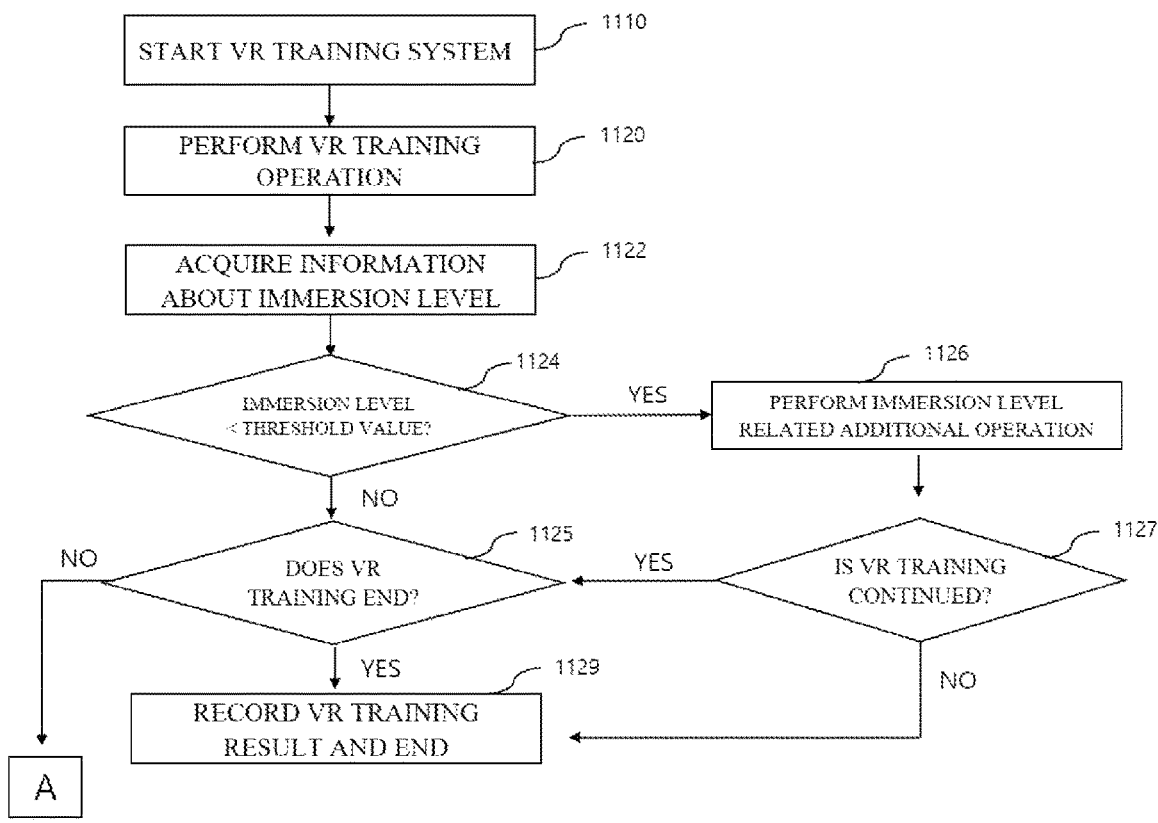
FIG. 11A is a view illustrating an operation of a VR device related to an immersion level and task processing according to various exemplary embodiments of the present disclosure.
Figure 11B:
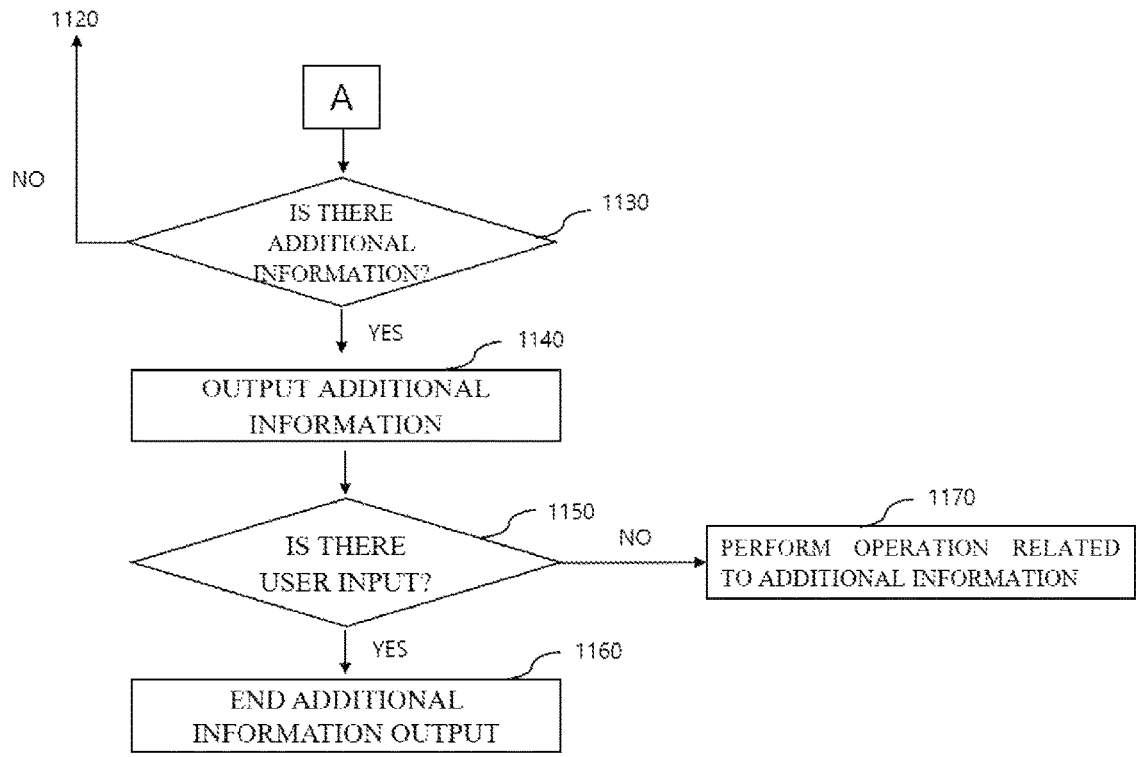
FIG. 11B is a view illustrating an operation of a VR device related to an immersion level and task processing according to various exemplary embodiments of the present disclosure.

FIGS. 11A and 11B are views illustrating an operation of a VR device related to an immersion level and task processing according to various exemplary embodiments of the present disclosure.

Referring to FIGS. 11A and 11B, operations 1110 and 1120 correspond to the operations 1010 and 1020 of FIG. 10, respectively so that a detailed description thereof refers to the operations 1010 to 1020 of FIG. 10.

In an operation 1122, the VR device may acquire information about an immersion level of the user. The immersion level may be directly acquired from the VR device or may be acquired from another electronic device connected to the VR device. The immersion level of the user may correspond to a numerical value representing how much the user who experiences the virtual reality by means of the VR device concentrates on or immersed in the provided virtual reality. The information about the immersion level may be acquired from indirect information for evaluating the immersion level.

The indirect information for evaluating the immersion level may include at least one of various biometric information which may be acquired from the user who uses the VR device. The biometric information may include at least one information of electroencephalogram, respiration, a body temperature, a blood pressure, a blood flow, a current skin resistance, an eyeball, electrocardiogram, electromyogram, a pulse, and the like. The biometric information may be acquired from a sensor included in the VR device or may be acquired from the electronic device connected to the VR device to be provided to the VR device.

Further, the indirect information may include at least one of information acquired from manipulation or input instructions of the user who uses the VR device. For example, the indirect information may include at least one of the number of times inputting an instruction, an instruction input period, an instruction input frequency, and a reaction speed of a user.

Further, the indirect information for determining the immersion level is not limited to the above-described example, but may further include other information which may be acquired from the user who uses the VR devices.

The VR device may acquire information about the immersion level of the user based on at least one of the indirect information. For example, when pulse information among the biometric information is used, the immersion level may be evaluated based on information such as a change in the pulse when a pulse rate is less than a predetermined threshold value or for a predetermined time. An immersion level for the other biometric information may be evaluated by directly comparing the magnitude thereof with the predetermined threshold value or based on the information such as a changed amount for a predetermined time. According to various exemplary embodiments of the present disclosure, the predetermined threshold value which is compared with the indirect information may be defined as a first threshold value. The first threshold value may be set to have different values according to a type of the indirect information.

The immersion level for the indirect information acquired by the manipulation or input instruction of the user may be evaluated in a similar manner. For example, the number of times inputting an instruction from the user may be compared with a predetermined threshold value and the immersion level may be evaluated based on information such as a changed amount for the number of times inputting an instruction from the user for a predetermined time.

Although it has been described above that the information about the immersion level is acquired based on the indirect information, the indirect information may be used instead of the information about the immersion level. That is, a procedure of acquiring information about the immersion level from the indirect information is omitted, the operation 1040 may be performed in accordance with a comparison result of the indirect information and the threshold value.

When valid information about an immersion level is acquired in the operation 1122, the VR device proceeds to an operation 1124. For example, when at least one information about an immersion level is acquired, it may be determined that valid information about an immersion level is acquired and when information about an immersion level which satisfies a condition set by the user or the manager of the training system is acquired, the VR device proceeds to the operation 1124.

In the operation 1124, the VR device may compare information about an immersion level acquired in the operation 1122 with threshold value information for an additional operation. The threshold value information for an additional operation is defined as second threshold value information hereinbelow. The second threshold value may be set to have different values according to a type of the indirect information which becomes a basis for acquiring information about an immersion level. The VR device may perform different operations in accordance with a comparison result of acquired information about an immersion level and the second threshold value. In the meantime, there may be a plurality of information about an immersion level acquired by the VR device. In this case, it may be determined whether to perform an operation 1125 or an operation 1126 depending on whether at least one information about an immersion level satisfies the threshold value condition and it may be determined whether to perform the operation 1125 or the operation 1126 depending on whether at least one information about an immersion level does not satisfy the threshold value condition. Further, it may be determined whether to satisfy the threshold value condition by applying information about a predetermined priority or a weight to the plurality of information about an immersion level.

When it is determined that the immersion level is higher than the second threshold value, the VR device proceeds to the operation 1125. The VR device proceeds to the operation 1125 to determine whether the VR training ends. When the VR training does not end, the VR device proceeds to an operation 1130. The operation 1130 may correspond to the operation 1030 of FIG. 10. When the VR training ends, an operation 1129 is performed to end the operation of the VR device. Further, when the operation of the VR device ends, a VR training result may be recorded in the VR device or transmitted to the electronic device connected to the VR device to record the VR training result.

When it is determined that the immersion level is lower than the second threshold value, the VR device proceeds to the operation 1126. When the VR device proceeds to the operation 1126, the VR device may perform an immersion level related additional operation. In this case, the immersion level of the user is low so that the VR device may perform at least one of an operation for improving the immersion level of the user, an operation for providing a break to the user, and an operation for providing an alarm for the immersion level.

The operation for improving an immersion level may include an operation of changing an output of the VR device. For example, an amount of visual information among virtual reality information of the VR device may be changed. For example, luminance, brightness, and saturation corresponding to the visual information are changed to induce the improvement of the immersion level of the user. For example, when auditory information is changed, a volume of sound is changed to induce the improvement of the immersion level of the user. The operation for improving an immersion level may selectively change visual information, auditory information, or other information in accordance with the characteristic of the virtual reality which is currently being reproduced. Further, the number of outputs which induce the user instruction is increased to induce the improvement of the immersion level of the user. A magnitude of the output may be determined in accordance with the immersion level of the user which has been acquired in advance.

The operation for providing a break to the user may be an operation of stopping the operations of the VR device for a predetermined time or an operation for allowing a user to use the VR device after taking a break for a predetermined time or longer by notifying the break for the predetermined time. The break time may be determined based on the immersion level of the user which has been acquired in advance. The lower the immersion level, the longer the break time may be required. However, even though the VR device starts the operation for providing a break, an input for requesting to reevaluate the immersion level of the user may be input to the VR device and in this case, the VR device reevaluates the immersion level of the user to take a break or go to the operation 1120. The operation of providing an alarm to the user may indicate that the current immersion level is equal to or lower than a predetermined threshold value or a step that an efficiency of the VR training is degraded.

In an operation 1127, the VR device may determine whether to continue the VR training. For example, the information about the immersion level of the user may be acquired again after the operation 1127 and it may be determined whether to proceed the VR training based thereon. When the immersion level acquired in the operation 1127 is equal to or lower than a predetermined third threshold value, the VR device additionally performs the operation 1127 or determines that the VR training is no longer possible to end the procedure. When the VR device ends the procedure, the VR device may proceed to the operation 1129. When the immersion level exceeds the predetermined third threshold value, the VR device may determine that the VR training can be continued and proceed to the operation 1120 or 1125.

When the VR device proceeds to the operation 1130 in accordance with the determination result of the operation 1125, the VR device may perform the operations 1130, 1140, 1150, 1160, and 1170. Operations 1130 to 1170 of FIGS. 11A and 11B may correspond to the operations 1030 to 1070 of FIG. 10 and a specific operation refers to the description of FIG. 10.

In the meantime, in the exemplary embodiment of FIGS. 11A and 11B, the operation of the VR device when the immersion level of the user is lower than the predetermined threshold value has been described based on the operation 1040, but the scope of the present disclosure is not limited thereto and the same may be applied to the over-immersive situation. When the user excessively immerses in the virtual reality provided by the VR device, it may affect the user's safety so that an operation for suppressing an over-immersion situation may be necessary.

For example, in the operation 1124, the VR device may determine whether the immersion level exceeds a predetermined threshold value (fourth threshold value) to determine the over-immersion. When the immersion level does not exceed the fourth threshold value, the above-described operation 1125 may be performed.

When the immersion level exceeds the fourth threshold value, the VR device may perform the operations 1126 and 1127. In the operation 1127, the VR device may perform at least one of operations for notifying the over immersion, providing a break time, and lowering the immersion level of the user.

The operation for lowering an immersion level may include an operation of changing an output of the VR device. For example, an amount of visual information among virtual reality information of the VR device may be changed. For example, luminance, brightness, and saturation corresponding to the visual information are changed to induce the lowering of the immersion level of the user. For example, when auditory information is changed, a volume of sound is changed to induce the lowering of the immersion level of the user. The operation for improving an immersion level may selectively change visual information, auditory information, or other information in accordance with the characteristic of the virtual reality which is currently being reproduced. Further, the number of outputs which induce the user instruction is reduced to induce the improvement of the immersion level of the user. The magnitude of the output provided by the VR device or the input required by the VR device to lower the immersion level of the user may be adjusted in accordance with the immersion level of the user which has been acquired in advance by the above-described method.

The operation for providing a break to the user may be an operation of stopping the operations of the VR device for a predetermined time or an operation for allowing a user to use the VR device after taking a break for a predetermined time or longer by notifying the break for the predetermined time. The break time may be determined based on the immersion level of the user which has been acquired in advance. The higher the immersion level, the longer the break time may be required. However, even though the VR device starts the operation for providing a break, an input for requesting to reevaluate the immersion level of the user may be input to the VR device and in this case, the VR device reevaluates the immersion level of the user to take a break or go to the operation 1120. The operation of providing an alarm to the user may indicate that the immersion level currently exceeds a predetermined threshold value or a situation that an efficiency of the VR training is degraded, or the user may be in danger.

The over-immersion control operation of the user as described above is not limited to the above-described exemplary embodiment and various operations of the present disclosure may also be applied not only to an example with a low immersion level, but also an over-immersive state that the immersion level exceeds a predetermined threshold value.

In the exemplary embodiment of FIGS. 11A and 11B, when the immersion level exceeds a predetermined threshold value, the VR device proceeds to a next operation to provide task related additional information. Therefore, when a specific task is performed, if an immersion level condition determined by the manager of the VR training or set to the VR device is satisfied, a next task is performed and when the next task is performed, additional information is provided, to improve the VR training efficiency.

Figure 12:
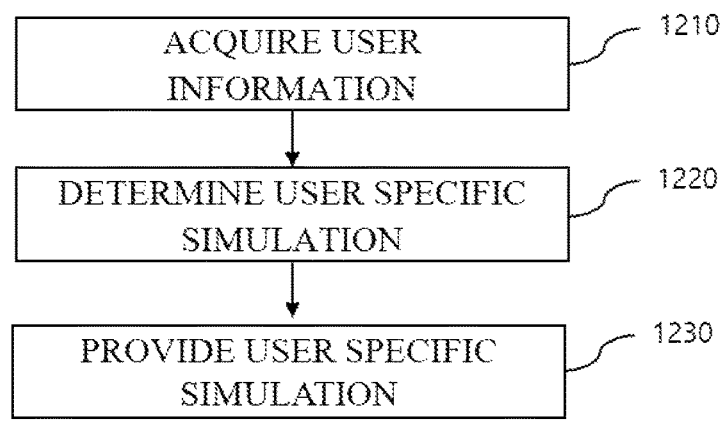
FIG. 12 is a view illustrating a method for providing additional information according to various exemplary embodiments of the present disclosure.

FIG. 12 is a view illustrating a method for providing additional information according to various exemplary embodiments of the present disclosure. An exemplary embodiment of FIG. 12 may be applied as an operation of providing additional information in the exemplary embodiment of FIG. 10, 11A, or 11B.

Referring to FIG. 12, in an operation 1210, the VR device may acquire user information about a user who experiences a virtual reality by means of the VR device. The user information may be a biometric signal of the user, which is collected by the VR device, information about a body of the user, user information input by the user, or information collected by the VR device during the VR training process. A parameter of the user information which may be reflected to the simulation may be set in advance in the VR device and the VR device may acquire the user information in accordance with the setting to provide a simulation.

In an operation 1220, the VR device may determine a user specific simulation to be provided to a user using a simulation operation provided as an additional information related operation and the acquired user information.

For example, when biometric information is used, a biometric signal such as a pulse rate or a heart rate of the user may be used in an exercise simulation operation. The VR device may determine an exercise simulation with an intensity appropriate for a body condition of the user as a user specific simulation based on the current biometric signal of the user.

For example, in a simulation operation for manufacturing products, the user may have left-handed characteristics. The corresponding information may be acquired by the input of the user or during the VR training process by the VR device. In this case, the VR device may determine a simulation for manufacturing products performed by a left-handed person as a user specific simulation.

For example, in a simulation operation of checking a specific location, a point of view or a field of view of viewing an object or a location of the virtual reality may vary depending on the user's height. The VR device may determine a user specific simulation to which the point of view or the field of view of the user is reflected using acquired information about the height of the user.

For example, a result that is performed by the user so far in the virtual training scenario may be reflected. For example, when lifesaving training in a fire situation is performed by the VR training, the user may save and accompany n people by the current point of time. When the task needs to be performed at a timing of providing additional information, a type of tasks to be performed by the user may vary depending on how many people are currently being rescued. The VR device reflects the training result of the user so far as described above to provide a user specific simulation.

In an operation 1230, the VR device may provide the determined user specific simulation as an additional information related operation.

When the simulation based on the user information is provided as described above, during the VR training, the most efficient simulation specific to the user is provided so that the VR training efficiency may be entirely improved.

In the meantime, although in the exemplary embodiment of FIG. 12, the simulation has been described, the user information may also be used for an operation other than an operation of providing a simulation, with regard to the additional information providing operation.

That is, with regard to the operation of providing additional information such as a text, an image, or a video, the user specific additional information providing operation may be performed based on the user information.

Figure 13:
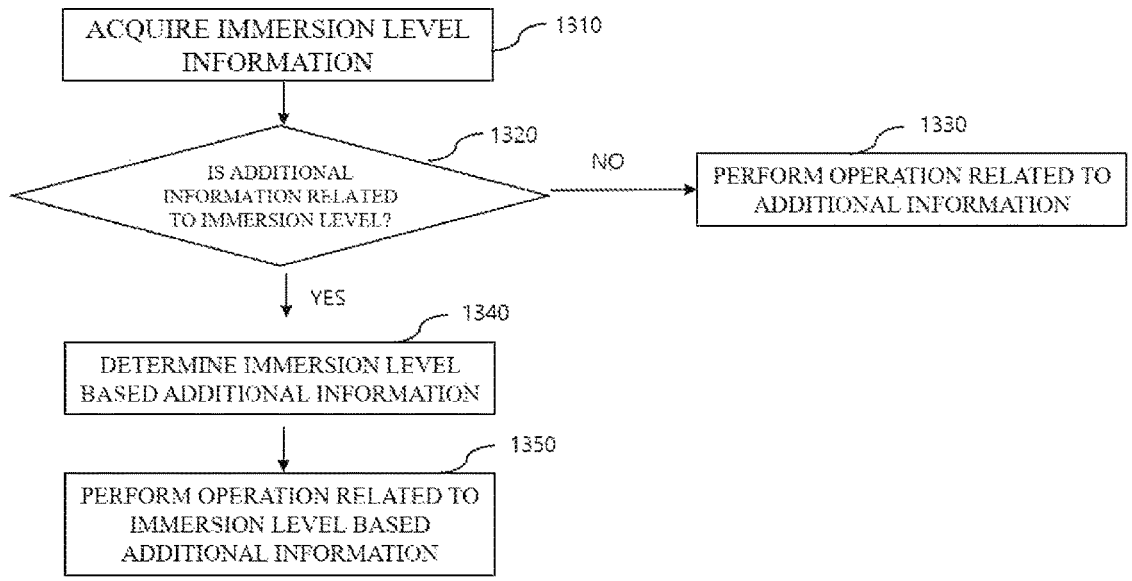
FIG. 13 is a view illustrating a method for performing additional information related operation based on an immersion level according to various exemplary embodiments of the present disclosure.

FIG. 13 is a view illustrating a method for performing additional information related operation based on an immersion level according to various exemplary embodiments of the present disclosure. An exemplary embodiment of FIG. 13 may be applied for an operation of providing additional information in the exemplary embodiment of FIG. 10, 11A, or 11B.

Referring to FIG. 13, in an operation 1310, the VR device may acquire immersion level information. A specific operation related to acquiring an immersion level refers to an operation 1122 and related operations in FIGS. 11A and 11B.

In an operation 1320, the VR device may confirm whether additional information to be provided at a current point of time is related to the immersion level. When the information is not related to the immersion level, the VR device may proceed to an operation 1330 and when the information is related to the immersion level, the VR device may proceed to an operation 1340.

When the VR device proceeds to the operation 1330, the VR device may perform the additional information related operation without considering an immersion level. The VR device may perform an operation corresponding to the operation 1070 of FIG. 10 or the operation 1170 of FIGS. 11A and 11B.

When the VR device proceeds to the operation 1340, the VR device may determine additional information to be provided in consideration of the immersion level. When the immersion level is lower than a predetermined threshold value, the VR device may determine additional information for improving an immersion level. For example, the VR device may provide additional information based on the video or simulation. Further, when the simulation is provided, a virtual reality for improving a user immersion level may be determined. When the immersion level is higher than a predetermined threshold value, the VR device may determine additional information for lowering an immersion level. For example, the VR device may provide additional information based on a text or an image. Further, when the simulation is provided, the simulation may be determined by adjusting visual information or lowering a level of completion of the virtual reality to lower the immersion level of the user.

In an operation 1350, the VR device may perform an additional information related operation for providing the determined additional information. The VR device may perform an operation corresponding to the operation 1070 of FIG. 10 or the operation 1170 of FIGS. 11A and 11B.

Figure 14:
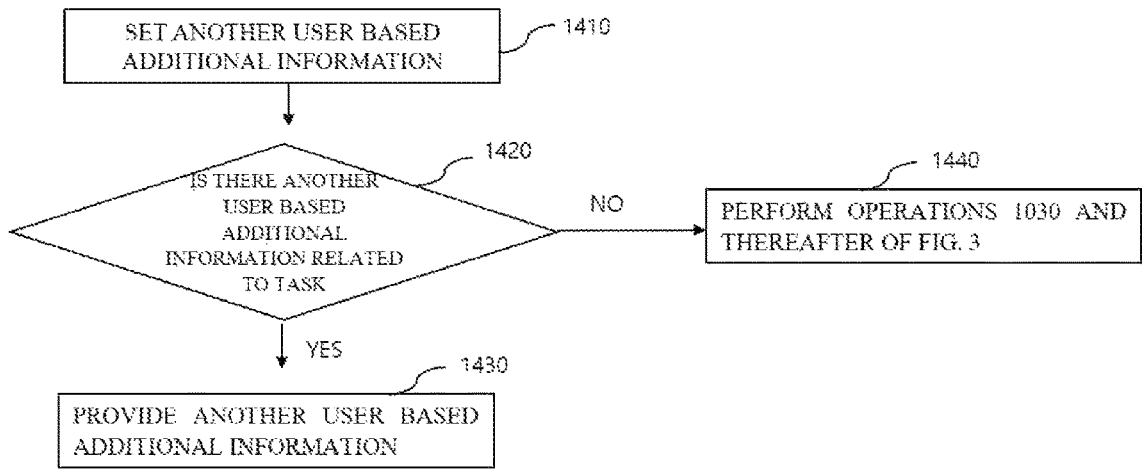
FIG. 14 is a view illustrating a method for providing additional information by another user according to various exemplary embodiments of the present disclosure.

FIG. 14 is a view illustrating a method for providing additional information by another user according to various exemplary embodiments of the present disclosure. An exemplary embodiment of FIG. 14 may be applied as an extended embodiment of providing additional information in the exemplary embodiment of FIG. 10, 11A, or 11B.

Referring to FIG. 14, in an operation 1410, additional information based on another user may be set in the VR device. In the case of the VR training in which a plurality of users participates, another user may refer to the other user who participates in the VR training in which the user is participating or a user who previously used the VR training.

For example, another user who previously experienced the VR training may store a tip related to a specific task or the corresponding information may be set as additional information to be provided to the current user. Further, when another user appropriately performs the corresponding task previously, a virtual reality screen of the corresponding user may be set as a simulation, a video, or an image.

Similarly, when a plurality of users uses the VR training together, data such as a tip or a simulation of a user who performs the corresponding task first may be set as additional information.

When the VR training result of another user satisfies the predetermined condition, the VR device may store the task performance related operation of another user as another user based additional information. For example, when the VR training result is performed above a predetermined score, a skill level, or a completion level, the training process of another user may be helpful to the other user so that this may be stored or set as another user based additional information.

In an operation 1420, the VR device determines whether there is another user based additional information related to the task. When there is another user based additional information, the VR device may proceed to an operation 1430 and when there is no another user based additional information, the VR device may proceed to an operation 1440.

When the VR device proceeds to the operation 1430, another user based additional information may be provided to the user. In the meantime, when there are another user based additional information and general additional information described in the exemplary embodiment of FIG. 10, an interface for selecting additional information may be output and corresponding additional information may be provided in accordance with the choice of the user. Further, a priority of the additional may be set by the setting of the VR device or the user's setting and when there is a plurality of additional information, additional information to be provided may be determined in accordance with the priority.

When the VR device proceeds to the operation 1440, operations 1030 and thereafter of FIG. 10 may be performed.

The exemplary embodiments disclosed in the present specification and the drawings merely provide a specific example for easy description and better understanding of the present disclosure, but are not intended to limit the scope of the present disclosure. Accordingly, the scope of the present disclosure should be interpreted that all changes or modifications derived based on the technical features of the present disclosure are included in the scope of the present disclosure as well as the exemplary embodiments disclosed herein.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A method for operating a virtual reality (VR) device, comprising:
   performing a VR training operation;
   acquiring information about an immersion level of a user while performing the VR training operation;
   comparing the information about the immersion level of the user with a predetermined threshold value; and
   performing a first operation for improving the immersion level of the user when the information about the immersion level is lower than the predetermined threshold value,
   wherein the acquiring of information about the immersion level includes:
   determining whether a plurality of immersion level information is acquired;
   determining whether the immersion level information which satisfies an absolute condition among the plurality of immersion level information is included, if the plurality of immersion level information is acquired;
   performing the comparing the information about the immersion level of the user with the predetermined threshold value, if the plurality of immersion level information is not acquired;
   processing the immersion level information which satisfies the absolute condition as the information about the immersion level by excluding another immersion level information if the immersion level information which satisfies the absolute condition is included; and
   processing an average value acquired from the plurality of immersion level information as the information about the immersion level if the immersion level information which satisfies the absolute condition is not included.

2. The method for operating a virtual reality (VR) device according to claim 1, wherein the first operation includes at least one of an operation of outputting an alarm for the immersion level to the user, an operation of providing a break time to the user during VR training, and an operation of controlling an output of the VR device based on a characteristic of a virtual reality which is currently being provided, and
   the method further includes: determining whether to continue the VR training by reevaluating the immersion level of the user after the first operation.

3. The method for operating a virtual reality (VR) device according to claim 1, wherein the acquiring of information about an immersion level includes:
   determining whether a predetermined condition to acquire the information about the immersion level is satisfied; and
   acquiring the information about an immersion level when the condition is satisfied, and
   the predetermined condition includes at least one of a timing, a period, a priority of indirect information, and a prerequisite of the indirect information.

4. The method for operating a virtual reality (VR) device according to claim 1, further comprising:
   acquiring indirect information for the information about the immersion level;
   determining validity of the indirect information based on validity determination information set with regard to the indirect information;
   discarding the indirect information when the indirect information is not valid; and
   acquiring the information about an immersion level based on the indirect information when the indirect information is valid.

5. The method for operating a virtual reality (VR) device according to claim 1, further comprising:
   setting a type of indirect information and a timing for acquiring the information about the immersion level,
   wherein the timing is set among the entire timing of the VR training by a manager in accordance with importance and the type of the indirect information is determined based on a characteristic of the virtual reality provided at the timing.

6. The method for operating a virtual reality (VR) device according to claim 1, further comprising:
   storing immersion level information and training section information corresponding to a timing when the immersion level information is acquired;
   determining whether the training section is an essential training section; and
   performing retraining on the training section based on determination of the essential training section.

7. The method for operating a virtual reality (VR) device according to claim 1, wherein the performing of a first operation includes:
   determining a type of indirect information which is a basis of the information about the immersion level;
   adjusting an output of the VR device based on the type of the indirect information; and
   determining whether the immersion level of the user is improved in accordance with the adjustment of the output of the VR device.

8. A method for operating a virtual reality (VR) device, comprising:
   performing a VR training operation;
   determining whether there is additional information to output while performing the VR training operation;
   acquiring immersion level information of a user who performs the VR training;
   determining whether there is a user input for the additional information output if it is determined that there is the additional information; and
   providing an operation related to the additional information based on the user input,
   wherein the additional information includes instruction information to perform a task of the VR training,
   wherein the acquiring of the immersion level information includes:
   determining whether a plurality of information about the immersion level is acquired;
   determining whether an information about the immersion level which satisfies an absolute condition among the plurality of information about the immersion level is included, if the plurality of information about the immersion level is acquired;
   comparing the immersion level information with a predetermined threshold value, if the plurality of information about the immersion level is not acquired;
   processing the information about the immersion level which satisfies the absolute condition as the immersion level information by excluding another information about the immersion level, if the information about the immersion level which satisfies the absolute condition is included; and processing an average value acquired from the plurality of information about the immersion level as the immersion level information if the information about the immersion level which satisfies the absolute condition is not included.

9. The method for operating a virtual reality (VR) device according to claim 8, further comprising:

acquiring user information for providing the additional information; and determining a user specific simulation based on the user information, wherein the providing of the operation related to the additional information includes providing the user specific simulation.

10. The method for operating a virtual reality (VR) device according to claim 8, further comprising:

determining whether the additional information is related to the immersion level information;

determining additional information based on the immersion level information if the additional information is related to the immersion level information; and performing an operation related to the additional information if the additional information is not related to the immersion level information, wherein the providing of the operation related to the additional information includes providing additional information based on the immersion level information.

11. The method for operating a virtual reality (VR) device according to claim 8, further comprising:

setting another user based additional information; and determining whether another user based additional information is set with regard to the task, wherein the providing of the operation related to the additional information includes if another user based additional information is set with regard to the task, providing predetermined another user based additional information, and the providing of the operation related to the additional information includes if the another user based additional information is not set with regard to the task, providing general additional information related to the task.

12. The method for operating a virtual reality (VR) device according to claim 8, wherein the determining of whether there is additional information includes when a user does not perform a predetermined operation based on a gaze, a movement direction, and a task related first operation of the user who performs the VR training, determining that the additional information needs to be provided.

13. The method for operating a virtual reality (VR) device according to claim 8, further comprising:

acquiring immersion level information of a user who performs the VR training; and when the immersion level information of the user exceeds a predetermined threshold level, determining whether there is the additional information to be output.

14. The method for operating a virtual reality (VR) device according to claim 13, further comprising:

determining indirect information used to acquire the immersion level information; and determining additional information corresponding to the indirect information.

\* \* \* \* \*